US012035869B2

(12) United States Patent
Ko

(10) Patent No.: US 12,035,869 B2
(45) Date of Patent: Jul. 16, 2024

(54) DISHWASHER

(71) Applicant: LG Electronics Inc., Seoul (KR)

(72) Inventor: Myungwon Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/431,805

(22) PCT Filed: Jan. 20, 2020

(86) PCT No.: PCT/KR2020/000966

§ 371 (c)(1),
(2) Date: Aug. 18, 2021

(87) PCT Pub. No.: WO2020/171393

PCT Pub. Date: Aug. 27, 2020

(65) Prior Publication Data

US 2022/0142451 A1 May 12, 2022

(30) Foreign Application Priority Data

Feb. 18, 2019 (KR) ........................ 10-2019-0018560

(51) Int. Cl.
*A47L 15/42* (2006.01)
*E05D 3/06* (2006.01)

(52) U.S. Cl.
CPC ....... *A47L 15/4261* (2013.01); *A47L 15/4265* (2013.01); *E05D 3/06* (2013.01); *E05Y 2201/682* (2013.01); *E05Y 2201/686* (2013.01); *E05Y 2900/304* (2013.01)

(58) Field of Classification Search
None
See application file for complete search history.

(56) References Cited

FOREIGN PATENT DOCUMENTS

| | | |
|---|---|---|
| EP | 3081136 | 10/2016 |
| EP | 3108791 | 12/2016 |
| EP | 3219244 | 9/2017 |
| EP | 2407723 | 10/2017 |
| JP | H05115408 | 5/1993 |
| JP | H08112230 | 5/1996 |
| KR | 10-2006-0100700 | 9/2006 |

(Continued)

OTHER PUBLICATIONS

International Search Report in International Appln. No. PCT/KR2020/000966, dated May 21, 2020, 5 pages (with English translation).

(Continued)

*Primary Examiner* — Rita P Adhlakha
(74) *Attorney, Agent, or Firm* — Fish & Richardson P.C.

(57) ABSTRACT

A dishwasher includes a tub, a base in a lower side of the tub, a door, a cover panel that covers the door and the base, and a link module connected to the door and the cover panel and configured to move the cover panel in a length direction of the door. The link module includes a first link having a first link-bracket connection portion connected to the door and spaced apart from a door rotating shaft, a second link disposed in a rear of the first link and rotatably connected to the first link and the tub, and a third link disposed in front of the first link and rotatably connected to the first link and the cover panel. When the door is opened, the first link-bracket connection portion moves from a rear of the door rotating shaft to a front upper side of the door rotating shaft.

15 Claims, 17 Drawing Sheets

(56) References Cited

FOREIGN PATENT DOCUMENTS

| | | |
|---|---|---|
| WO | WO2018001496 | 1/2018 |
| WO | WO2018207063 | 11/2018 |

OTHER PUBLICATIONS

Office Action in Australian Appln. No. 2020225795, dated Oct. 17, 2022, 4 pages.

Extended European Search Report in European Appln. No. 20759240.3, dated Oct. 19, 2022, 12 pages.

Notice of Allowance in Korean Appln. No. 10-2019-0018560, mailed on Apr. 24, 2024, 4 pages (with English translation).

DISHWASHER

CROSS-REFERENCE TO RELATED APPLICATIONS

This application is a National Stage application under 35 U.S.C. § 371 of International Application No. PCT/KR2020/000966, filed on Jan. 20, 2020, which claims the benefit of Korean Patent Application No. 10-2019-0018560, filed on Feb. 18, 2019. The disclosures of the prior applications are incorporated by reference in their entirety.

TECHNICAL FIELD

The present disclosure relates to a dishwasher, and more particularly, to a dishwasher including a cover panel mounted in a door so as to be movable in a vertical direction.

BACKGROUND ART

A dishwasher is a home appliance that washes contaminants such as food residues on dishes, cooking utensils, etc. (hereinafter, 'washing target') by high-pressure washing water sprayed from a spray arm.

The dishwasher may wash a washing target in an inner space of a tub. The front surface of the tub may be opened and covered by opening and closing of the door. A lower structure for temporarily storing or pumping washing water may be disposed in a lower side of the tub. Accordingly, a base forming a space in which the lower structure is disposed may be disposed in the lower side of the tub.

The front surface of the door may include a panel for covering the tub and the lower structure of the tub. The panel forms a rotating shaft between the tub and the base, and may be mounted in the rotating door. When the panel rotates by the door, the lower portion of the panel moves to an area where the base is disposed. Thus, the front of the base should be designed excluding the moving space of the panel.

However, if the panel moves when the door rotates, an area occupied by the panel moving space in the front of the base can be minimized, and to that extent, a space in which the lower structure can be disposed can be more secured.

In European Patent EP1894509B1, when the door rotates through a link structure connected to each of the door, the tub, and the panel, the panel disposed in the front of the door is moved to the upper side in the length direction of the door, thereby reducing a space where the panel is disposed in the lower side of the tub by the rotation of the door.

However, the above link structure has a structure in which a link fixed to the tub with a certain radius pulls a link connected to the panel when the door rotates. Thus, a structure for moving a panel, when the door rotates, by pulling the panel upward is disclosed.

In the above structure, since the link pulls the panel, the force acting on the panel is relatively insufficient, and the movement range of the panel is restricted by the link fixed to the tub with a certain radius, there is a problem that a section in which the panel can move may be limited.

European Patent EP2407723B1 has a three link structure connected to a tub, a door and a panel, and discloses a structure in which when the door rotates, a link disposed in the center moves to the lower side of the front and moves the panel.

However, the structure in which such a link moves to the lower side of the front has a structure in which the link is pushed forward when the door with low forward movement is initially opened, and the link is pushed downward when the door with large forward movement is opened later. Accordingly, there is a problem that the movement of the panel does not take into account the rotation range according to the opening of the door.

DISCLOSURE

Technical Problem

An object of the present disclosure is to provide a dishwasher that maximizes a space utilization range of a base by increasing a movement amount of a panel disposed in the front of a door.

Another object of the present disclosure is to provide a dishwasher that increases the movement range of a panel in consideration of the rotation of the door.

Another object of the present disclosure is to provide a dishwasher in which a panel is mounted and a door to which a load is added is stably opened and closed.

The problems of the present disclosure are not limited to the problems mentioned above, and other problems not mentioned will be clearly understood by those skilled in the art from the following description.

Technical Solution

In order to achieve the above object, a dishwasher according to the present disclosure has a structure in which a tub is spaced apart from a ground by a base, and includes a cover panel covering a door and the front surface of a base in front of the door that opens and closes the tub, and the cover panel has a structure that moves in the length direction of the door when the door is rotated by a link module. In detail, the link module comprises: a first link which is provided with a first link-bracket connection portion connected to the door at a position spaced apart from the door rotating shaft by a certain gap; a second link which is disposed in a rear of the first link and rotatably connected to the first link and the tub respectively; and a third link which is disposed in front of the first link, and having both ends rotatably connected to the first link and the cover panel respectively. In addition, when the door is opened, the first link-bracket connection portion moves from a rear of the door rotating shaft to a front upper side of the door rotating shaft. When the door is closed, the first link mainly moves upward, and when the door is fully opened, the first link mainly moves forward, thereby increasing the movement range of the cover panel.

The dishwasher further includes a door bracket which is fixedly fastened to the door and rotatably connected to the tub, and rotates the door based on the door rotating shaft, wherein the first link-bracket connection portion is rotatably connected to the door bracket at a position spaced apart from the door rotating shaft by a certain gap, so that as the door bracket moves the door rotating shaft, the first link-bracket connection portion spaced apart from the door rotating shaft by a predetermined distance rotates, and can move the first link.

The first link-bracket connection portion is connected to the door bracket so as to be disposed in a rear in a thickness direction of the door from the door rotating shaft, so that when the door is opened, it may move from the rear of the door rotating shaft to the front upper side of the door rotating shaft.

A length of a virtual straight line extending from the first link-bracket connection portion to one end of the first link connected to the third link is formed to be longer than a length of a virtual straight line extending from the first link-bracket connection portion to the other end of the first link connected to the second link, thereby increasing the movement range of the third link connected to the cover panel.

A virtual straight line extending from the first link-bracket connection portion to one end of the first link connected to the third link and a virtual straight line extending from the first link-bracket connection portion to the other end of the first link connected to the second link form an inclination angle with each other, and an inclination angle is formed in the range of 160 degrees to 175 degrees, so that an inclination angle may be formed between the straight line of the third link and a virtual straight line extending from the first link-bracket connection portion to one end of the first link connected to the third link even when the door is fully opened.

The door includes: an inner door which is in contact with a front surface of the tub, and closes an opened portion of the tub; a first outer door which is fastened to the inner door at a front of the inner door; and a second outer door which is disposed in an upper portion of the first outer door and coupled to the inner door, and the door bracket includes: a first door bracket which is fastened to the first outer door and rotatably connected to the tub; and a second door bracket which is connected to the first door bracket and fastened to the inner door, so that the door bracket can be stably fixed to the door.

The first door bracket includes: a tub connection portion rotatably connected to the tub; a door fastening portion which extends from the tub connection portion to an upper side of a length direction of the door, and is fastened to the inner door; and a link connection portion rotatably connected to the first link-bracket connection portion, and the link connection portion is disposed in a rear of a thickness direction of the door from the tub connection portion, so that when the door rotates, the link connection portion may move from the rear of the door rotating shaft to the front upper side of the door rotating shaft.

The dishwasher further includes a door fixing portion for maintaining a disposition of the door opened from the tub, by applying a force to the door in a direction opposite to a load acting on the door, when the door is opened, and the first door bracket may further comprises a door fixing portion-connection portion which extends from the tub connection portion to the rear of thickness direction of the door, and is connected to the door fixing portion, so that the door can be opened stably.

The dishwasher further includes a tub bracket which is fixed to the tub and the base respectively, and rotatably connected to the door bracket, and the tub bracket includes a door connection portion to which the door bracket is rotatably connected; a tub fastening portion which extends to an upper side of the door connection portion, and fastened to the tub; and a base fastening portion which extends to a lower side at a rear of the door connection portion, and is fastened to the base, so that the tub, the base, and the door bracket can be stably fixed.

The link module further includes a link bracket connecting the second link and the tub bracket, and the link bracket is connected to one end of the second link at the rear of the door rotating shaft, so that the second link can adjust the height at which the rotating shaft connected to link bracket is disposed.

When the door closes the tub, the first link-bracket connection portion is disposed between the door rotating shaft and one end of the second link connected to the link bracket, so that in the closed state of the door, the first link-bracket connection portion, the door rotating shaft, and the link bracket may be formed at the same height.

The link module further includes a link holder connecting the third link and the cover panel, and the link holder extends to a lower side of the length direction of the door from one end connected to the third link, and is connected to the cover panel at a lower end of the length direction of the door, so that the link module and the cover panel can be assembled at a lower portion of the cover panel.

When the door closes the tub, an angle between a virtual straight line extending from the first link-bracket connection portion to one end of the first link connected to the third link, and a virtual straight line extending from one end of the third link to the other end is formed to be 45 degrees or less, thereby increasing the force for pushing the cover panel upward when the door is initially opened.

When the door is fully opened from the tub, the angle between a virtual straight line extending from the first link-bracket connection portion to one end of the first link connected to the third link and a virtual straight line extending from one end of the second link to the other end form an obtuse angle smaller than a straight angle, thereby preventing malfunction of link module when the door is closed in a state where the door is fully opened.

The details of other embodiments are included in the detailed description and drawings.

Advantageous Effects

According to the dishwasher of the present disclosure, there are one or more of the following effects.

First, a first link is spaced apart from a door rotating shaft and rotates together with the door, and a third link moves a cover panel in a length direction of the door so that a space moving to an area where a base is disposed is reduced as the cover panel rotates. Accordingly, there is an advantage of high space utilization inside the base.

Second, when the door is opened, the first link-bracket connection portion moves from the rear of the door rotating shaft to the front upper side of the door rotating shaft, so that when the door is initially opened, the first link pushes the cover panel upward to increase the movement amount of the cover panel, and when the door is later opened, the first link pushes the cover panel forward to increase the movement amount of the cover panel. Accordingly, there is an advantage in that the movement of the cover panel can be increased in consideration of the rotation of the door.

Third, the door rotates through the door bracket and the tub bracket, the door bracket is fastened to the inside of the door, and is connected to the door fixing portion that applies force in the opposite direction to the opening direction of the door. Accordingly, there is an advantage in that the door can be opened stably.

Effects of the present disclosure are not limited to the effects mentioned above, and other effects not mentioned will be clearly understood by those skilled in the art from the description of the claims.

MODE FOR INVENTION

Figure 1A:
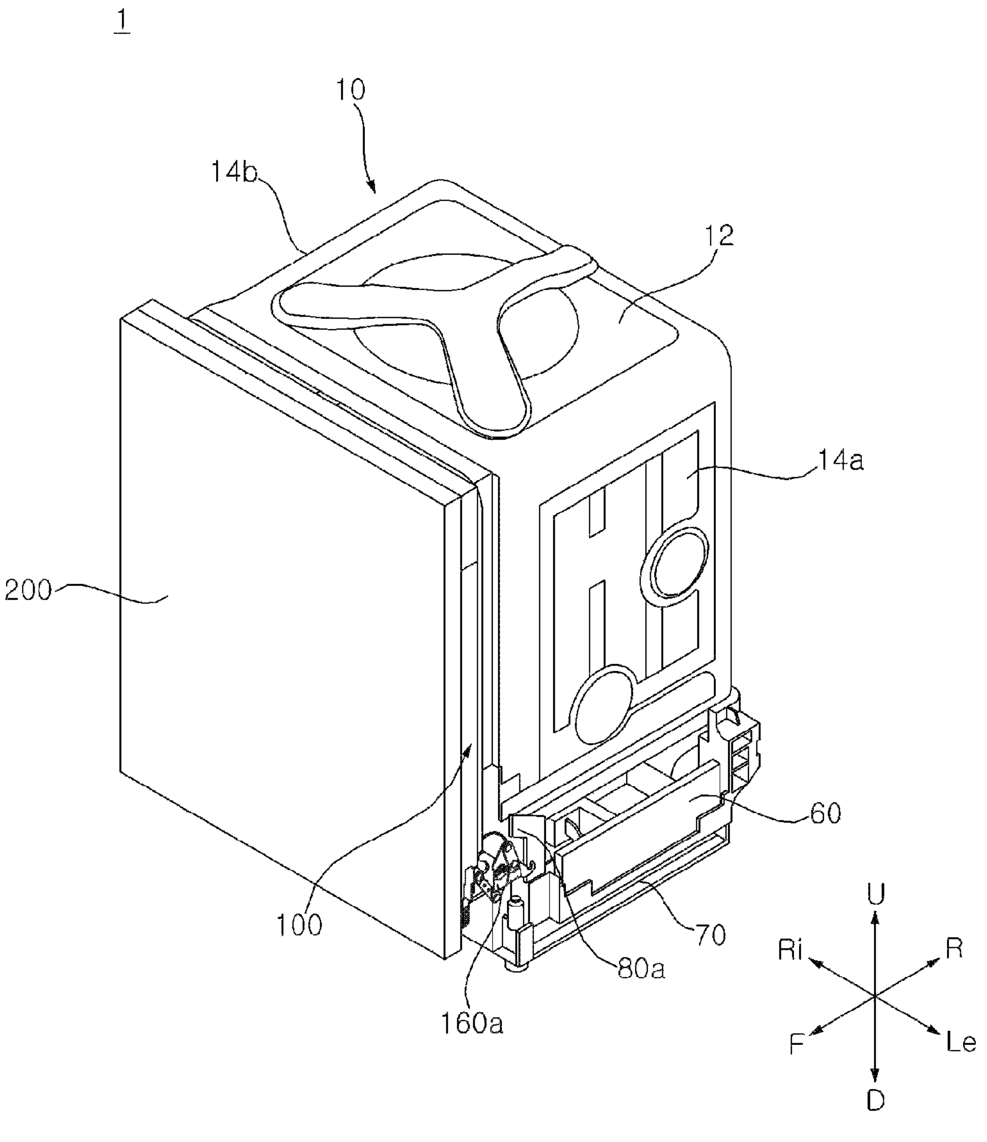
FIG. 1A is a perspective view of a dishwasher according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

Figure 11:
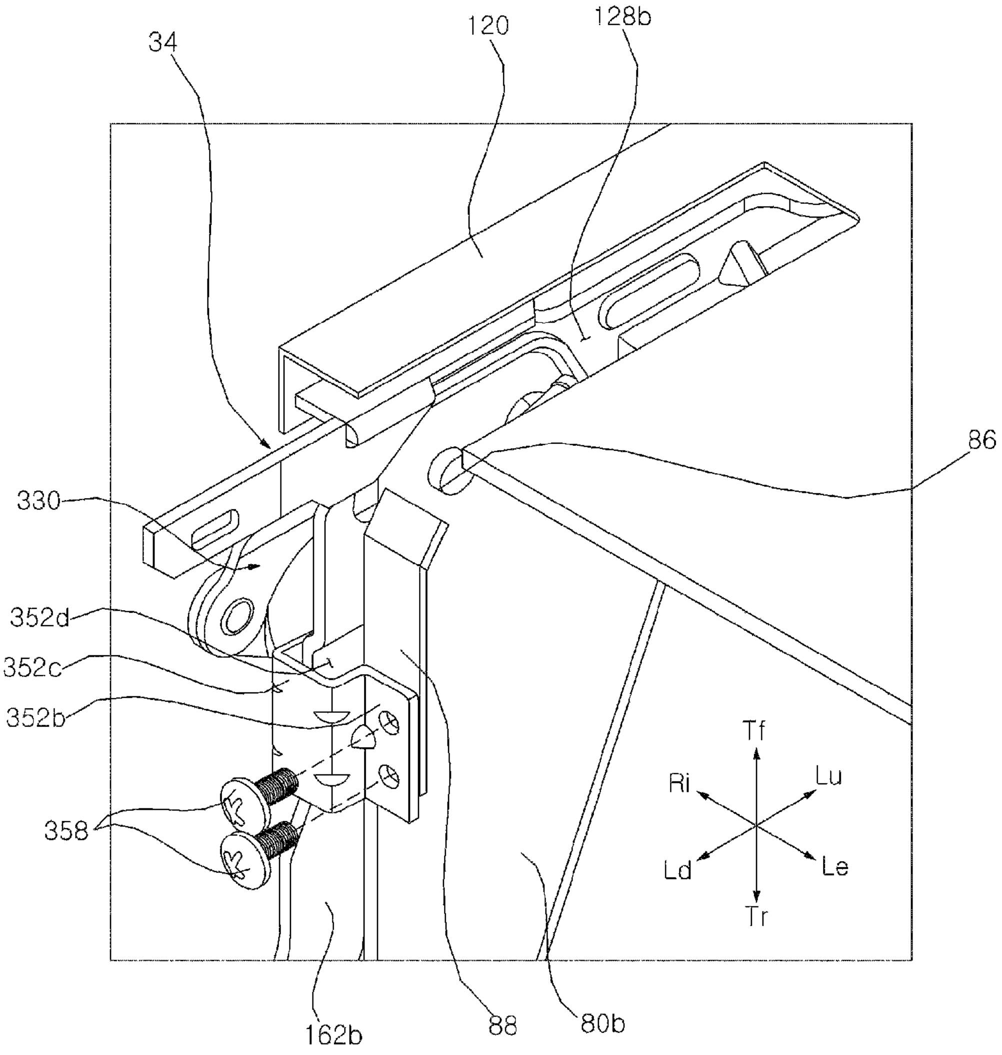
FIG. 11 is a view for explaining a connection relationship between a link bracket and a tub bracket according to an embodiment of the present disclosure.
Figure 12A:
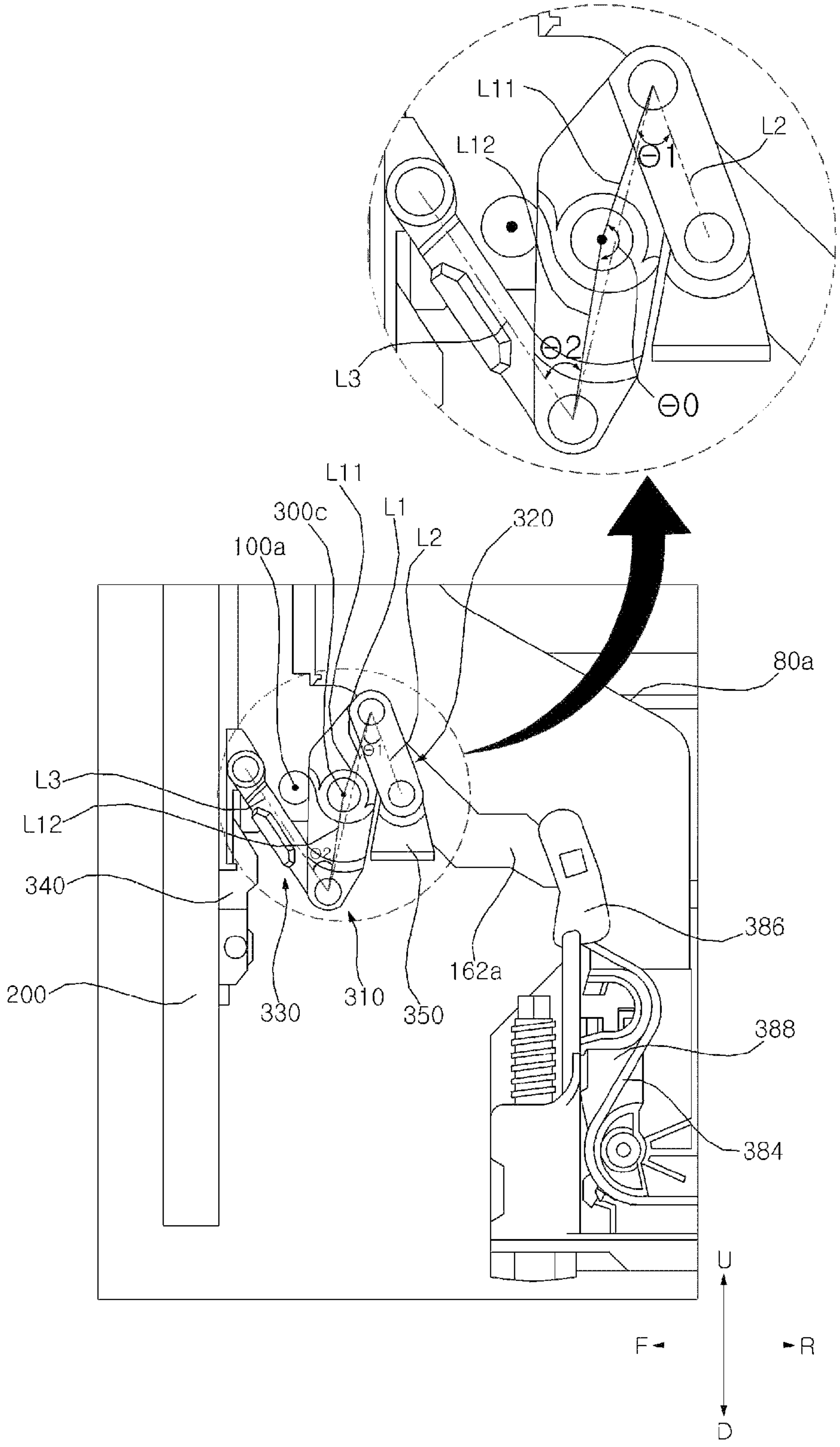
FIG. 12A is a view for explaining a disposition of a link module in a state in which a door is closed according to an embodiment of the present disclosure.
Figure 12B:
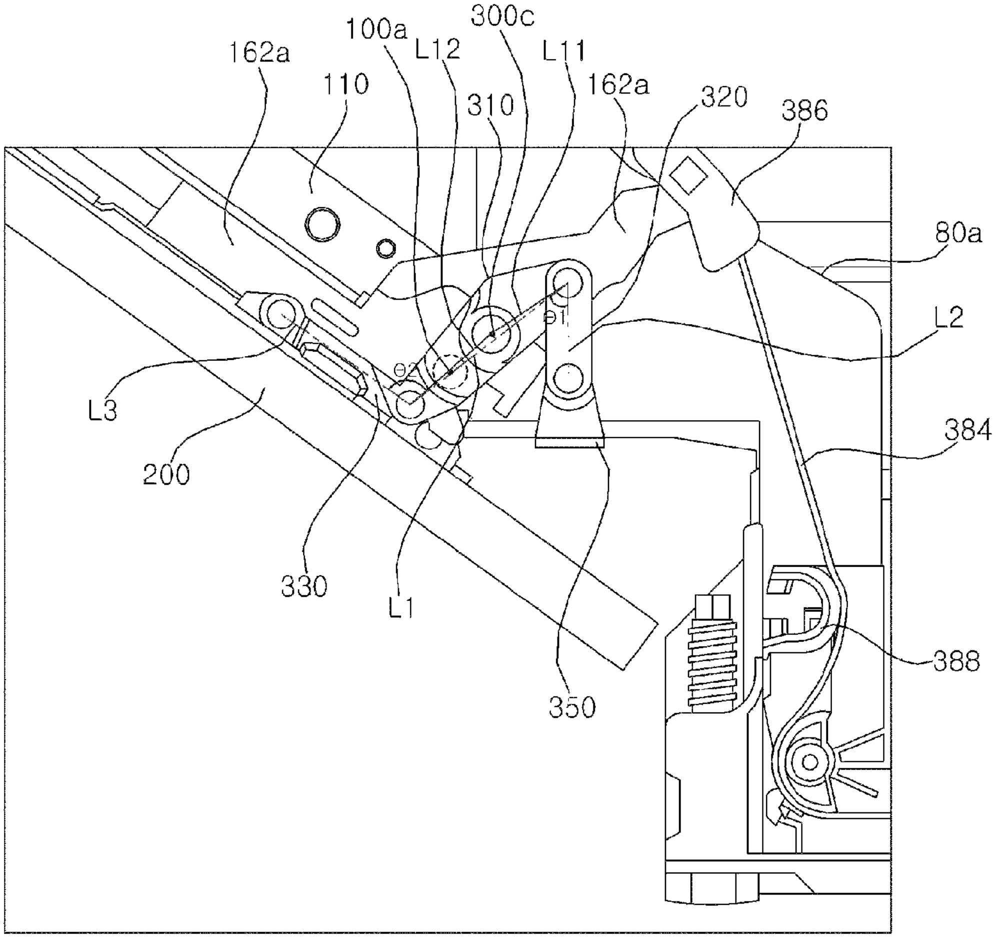
FIG. 12B is a view for explaining a disposition of a link module in a state in which a door is opened or closed according to an embodiment of the present disclosure.
Figure 12C:
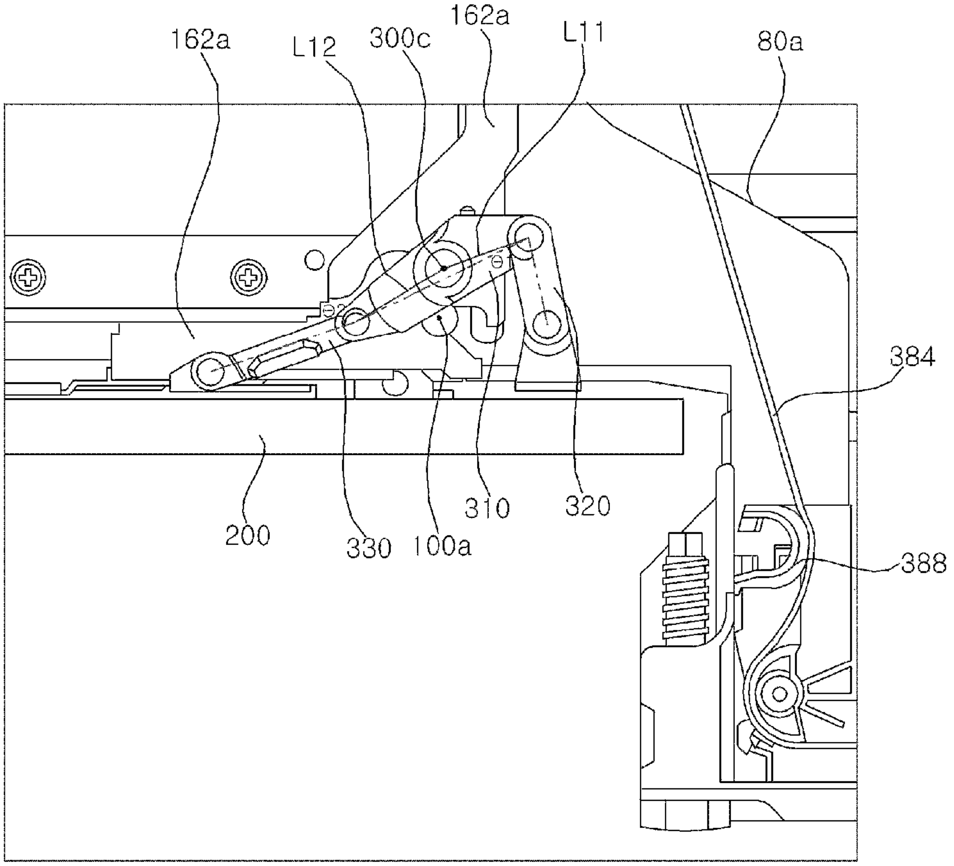
FIG. 12C is a view for explaining a disposition of a link module in a state in which a door is fully opened according to an embodiment of the present disclosure.

An expression indicating a direction such as up (U), down (D), left (Le), right (Ri), front (F), rear (R) used in FIGS. 1 to 5, and in FIGS. 11 to 12C is defined as shown in the drawing, but this is just an explanation for the present disclosure to be clearly understood, and it is obvious that each direction may be defined differently depending on where the reference is placed.

Referring to FIGS. 6 to 10, a door 100, a door bracket 160*a*, 160*b*, and a cover panel 200, the disposition of which is changed according to the rotation of the door 100, may be explained based on the door length direction Lu-Ld, the door thickness direction Tf-Tr, and the door width direction Le-Ri. In the case of the door length direction, the vertical direction may be classified as a vertical direction of the door length direction based on when the door 100 closes the tub 10. In addition, in the case of the door thickness direction, the front-rear direction may be classified as a front-rear direction of the door thickness direction based on when the door 100 closes a tub 10. Since the door width direction Le-Ri is constant regardless of the disposition change of the door 10, it is the same as the left-right direction Le-Ri of a dishwasher 1.

Such a direction setting may be applied regardless of the disposition of the door 100. Therefore, it can be applied regardless of the disposition of the door 100 rotatably mounted in one side of the tub 10. This is for describing the door 100 and the door bracket 160*a*, 160*b*, and does not limit the scope of the invention.

Hereinafter, the present disclosure will be described with reference to the drawings for explaining the dishwasher according to embodiments of the present disclosure.

<Overall Configuration>

Hereinafter, the overall configuration of the dishwasher 1 according to the present embodiment will be briefly described with reference to FIGS. 1A to 3.

Figure 1B:
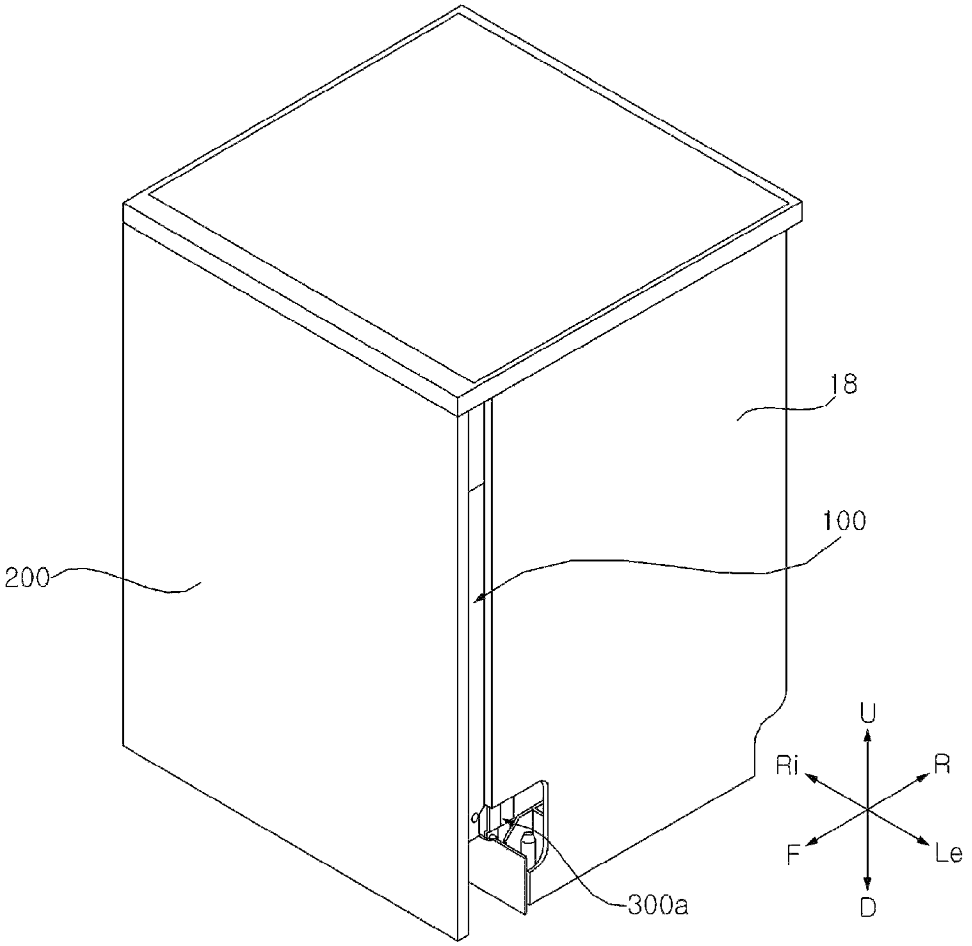
FIG. 1B is a perspective view of a dishwasher according to another embodiment of the present disclosure.
Figure 2:
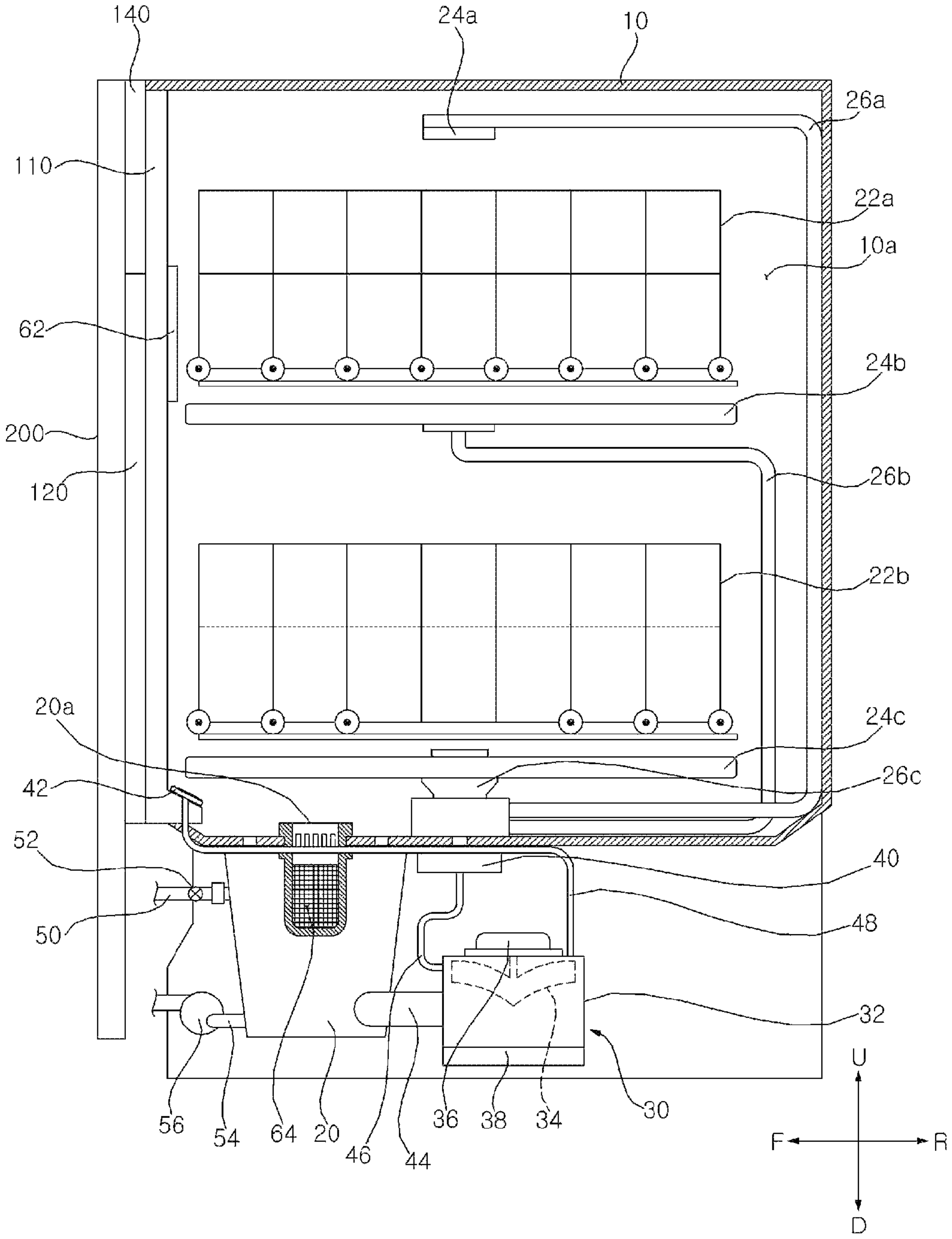
FIG. 2 is a schematic cross-sectional view of a dishwasher according to an embodiment of the present disclosure.

Referring to FIG. 1A, the dishwasher 1 according to the present embodiment may be used as a built-in in a space such as a kitchen. Accordingly, the dishwasher 1 according to the present embodiment may not include a separate case that covers the outside of the tub 10. However, in some embodiments, as shown in FIG. 1B, a case 18 forming an outer shape can be provided. Hereinafter, description will be made based on the dishwasher according to FIG. 1A, but the relationship between the link module 300*a*, 300*b*, the door 100, and the cover panel 200 described below may also be applied to a dishwasher having the case 18 of FIG. 1B.

The dishwasher 1 according to the present embodiment includes a tub 10 which forms a washing chamber 10*a* therein, and has an open front surface, a base 70 which is disposed in the lower side of the tub 10 and separates the tub 10 from the floor by a certain gap, a sump 20 which is disposed in the lower side of the tub 10 and temporarily stores washing water supplied to the tub 10, a door 100 which is rotatably connected to the tub 10 at the lower end of the tub 10, and opens and closes the open front surface of the tub 10, a cover panel 200 which covers the door 100 and the base 70, and is movably disposed in the door 100, and a link module 300*a*, 300*b* which moves the cover panel 200 in the length direction of the door, when the door 100 rotates.

The dishwasher 1 according to this embodiment may further include a rack 22*a*, 22*b* which is disposed inside the washing chamber 10*a*, and mounts washing target dishes, a plurality of spray nozzles 24*a*, 24*b*, 24*c* which sprays the washing water to the washing chamber 10*a*, a washing pump 30 which is disposed in the lower side of the tub 10, and pumps the washing water stored in the sump 20 to the plurality of spray nozzles 24*a*, 24*b*, 24*c*, a switching valve 40 which sends the washing water pumped from the washing pump 30 to at least one of the plurality of spray nozzles 24*a*, 24*b*, 24*c*, and a plurality of connection pipes 26*a*, 26*b*, 26*c* which connects the switching valve 40 and the plurality of spray nozzles 24*a*, 24*b*, 24*c*, respectively.

The washing pump 30 may rotate an impeller 34 disposed inside the washing pump housing 32 by using a washing motor 36 and supply washing water stored in the sump 20 to the tub 10. The washing pump 30 may further include a heater 38 for heating the washing water existing inside the washing pump housing 32. The heater 38 may generate steam by heating the washing water existing inside the washing pump 30.

The dishwasher 1 according to the present embodiment may further include a steam nozzle 42 for sending the steam generated by the heater 38 into the tub 10. The dishwasher 1 according to the present embodiment may include a washing pump inlet pipe 44 connecting the sump 20 and the washing pump 30, a washing pump discharge pipe 46 connecting the washing pump 30 and the switching valve 40, and a steam discharge pipe 48 connecting the washing pump 30 and the steam nozzle 42.

A filter 64 for filtering out foreign substances from the washing water flowing in from the tub 10 may be disposed in the sump 20. The dishwasher 1 according to the present embodiment may include a water supply pipe 50 for supplying washing water to the sump 20, a water supply valve 52 for opening and closing the water supply pipe 50, and a drain pipe 54 and a drain pump 56 for discharging the washing water of the sump 20 to the outside.

The tub 10 may have a box shape with an open front surface. The tub 10 may be connected to the sump 20 downwardly. The tub 10 may have a sump hole 20*a* connected to the sump 20 downwardly. A plurality of racks 22*a* and 22*b* may be disposed in the washing chamber 10*a* formed inside the tub 10.

A plurality of spray nozzles 24*a*, 24*b*, and 24*c* are disposed in the washing chamber 10*a* formed inside the tub 10. The plurality of spray nozzles 24*a*, 24*b*, 24*c* may spray the washing water toward the inner surface of the rack 22*a*, 22*b* or the tub 10.

A tub frame 16 may be disposed in the front side of the tub 10 so as to reinforce the strength of the tub 10. The tub frame 16 may be fastened to the tub 10, at the upper surface 12 of the tub 10 and at both side surfaces 14*a* and 14*b*.

The tub 10 is rotatably connected to the door 100 at the front lower end. The tub 10 may be hinge-connected to the door 100. That is, the door 100 may rotate based on the door rotating shaft 100*a* disposed at the front lower end of the tub 10.

The base 70 is disposed in the lower side of the tub 10, and supports the tub 10. The base 70 is a support means for separating the tub 10 from the floor by a certain gap, and may form a space in which the sump 20 and the washing pump 30 are disposed therein. A control box 60 accommodating a printed circuit board (not shown) for controlling the operation of the washing pump 30 and the like may be disposed in the inner side the base 70.

The front end 72 of the base 70 is separated from the front end 15 of the tub 10 to be disposed in the rear side of the front end 15 of the tub 10. The base 70 is disposed in the rear side of the tub 10 so as not to interfere with the movement of the cover panel 200 when the cover panel 200 moves due to the rotation of the door 100.

The front end 72 of the base 70 may have a shape that is inclined rearward as it progresses from the lower side to the upper side in consideration of the movement of the cover panel 200.

The tub 10 may be fastened to the base 70 and fixed to the upper side of the base 70. The tub 10 may be fastened to the base 70 by a separate fastening means (not shown). In addition, the tub 10 may be coupled to the base 70 through tub bracket 80*a*, 80*b* described below. The tub 10 and the base 70 according to the present embodiment may be fastened by a fastening means at the rear side, and by the tub bracket 80*a*, 80*b* at the front side.

The dishwasher 1 according to the present embodiment may further include an auto door module (not shown) that opens the door 100 of a closed state to the front within a certain range. The auto door module is disposed in the upper side of the tub 10, and may open the door 100 for closing the tub 10 within a certain range.

The auto door module according to the present embodiment may include a pressing portion (not shown) for opening the door 100 by pressing one side of the door 100, and a driving motor (not shown) for moving the pressing unit. The auto door module may open the door 10 by operating the driving motor to move the disposition of the pressing portion disposed in the upper side of the tub 10. When the door 10 is opened, the user may additionally open the door or close the door by using the cover panel 200 that moves to the upper side of the length direction of the door.

<Tub Bracket>

Figure 5:
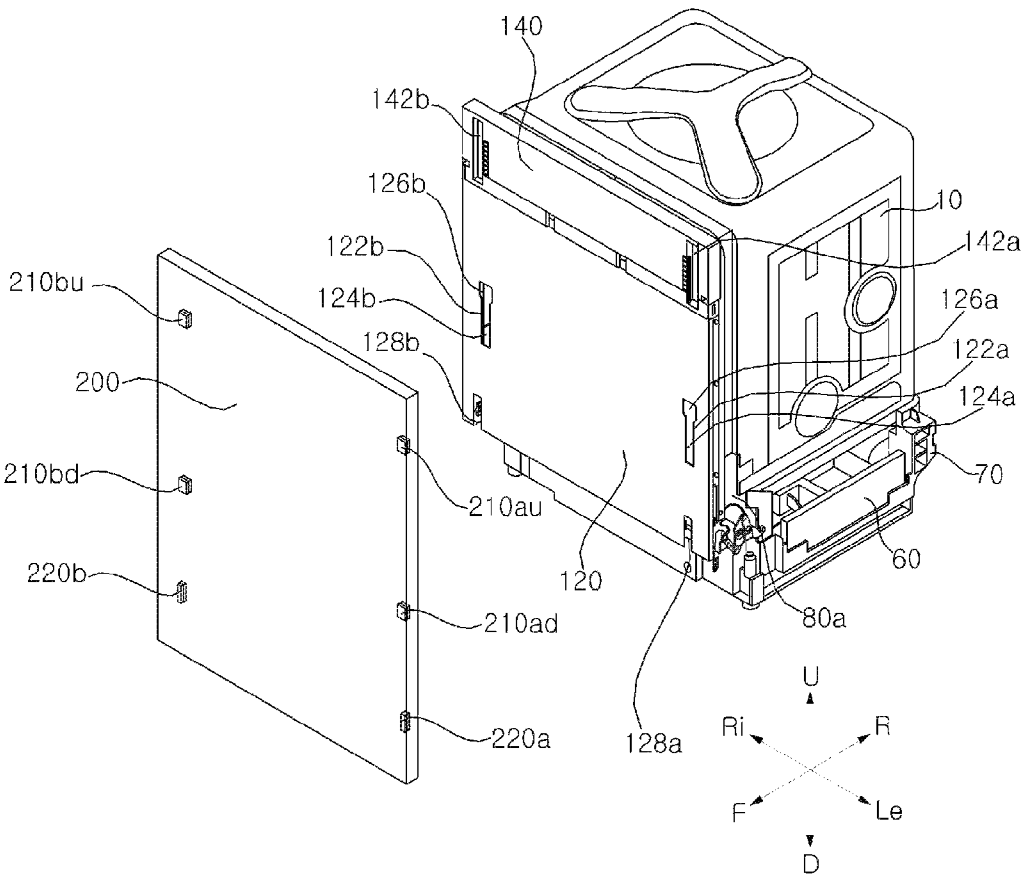
FIG. 5 is an exploded perspective view of a dishwasher and a cover panel according to an embodiment of the present disclosure.
Figure 6:
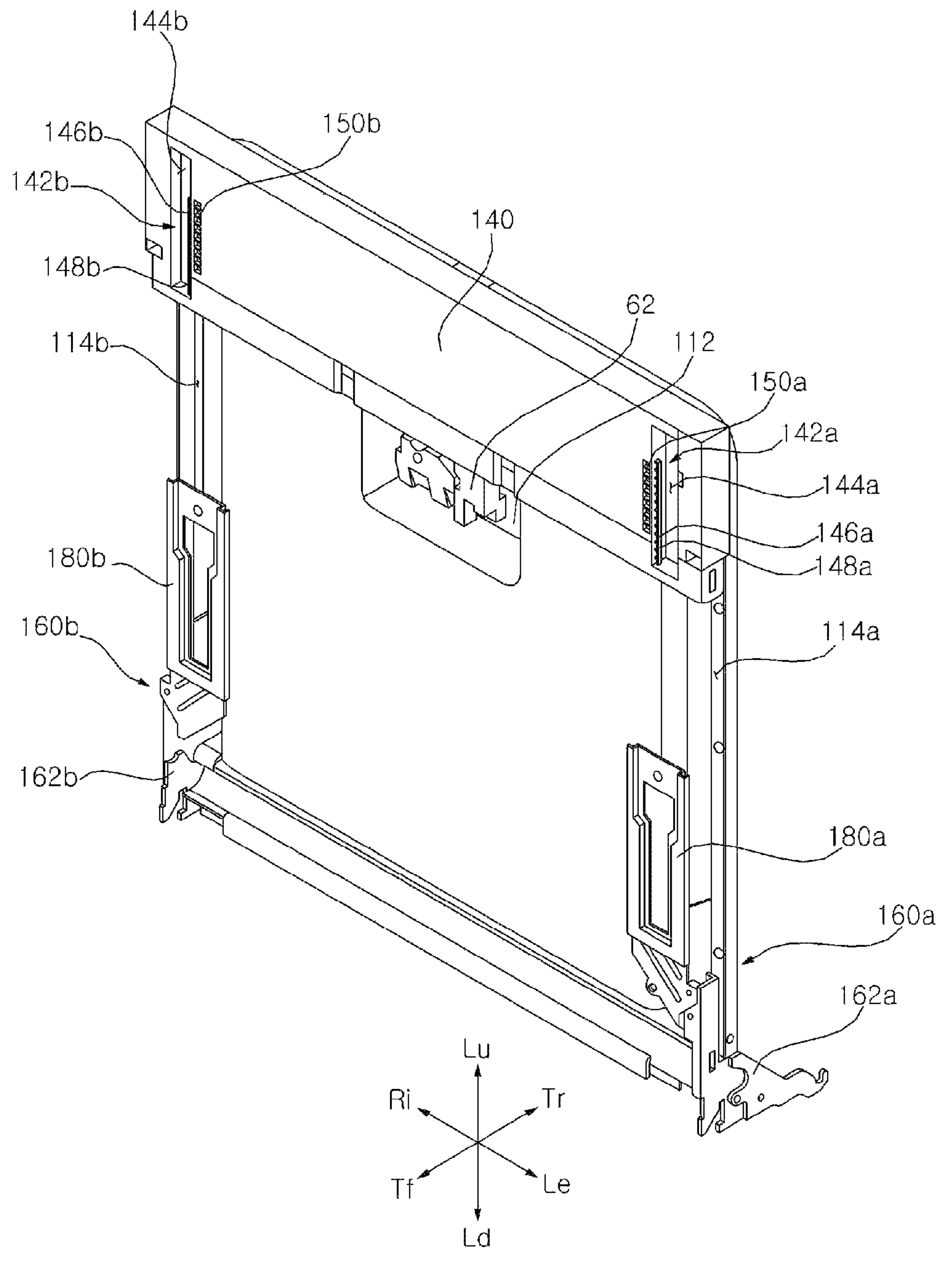
FIG. 6 is a perspective view of a door in a state in which a first outer door is removed according to an embodiment of the present disclosure.
Figure 7A:
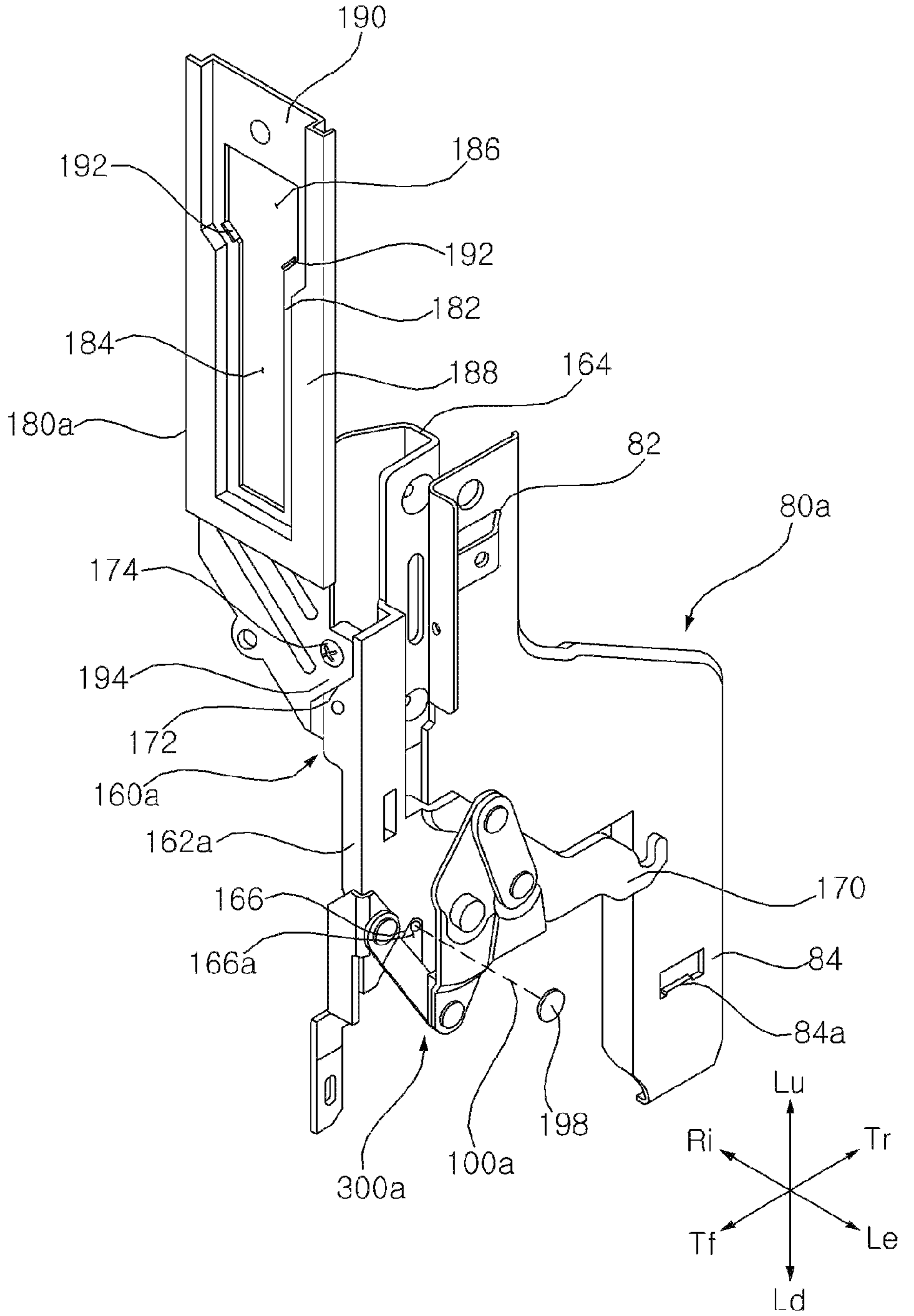
FIG. 7A is a perspective view of a tub bracket, a door bracket, and a link module according to an embodiment of the present disclosure.
Figure 7B:
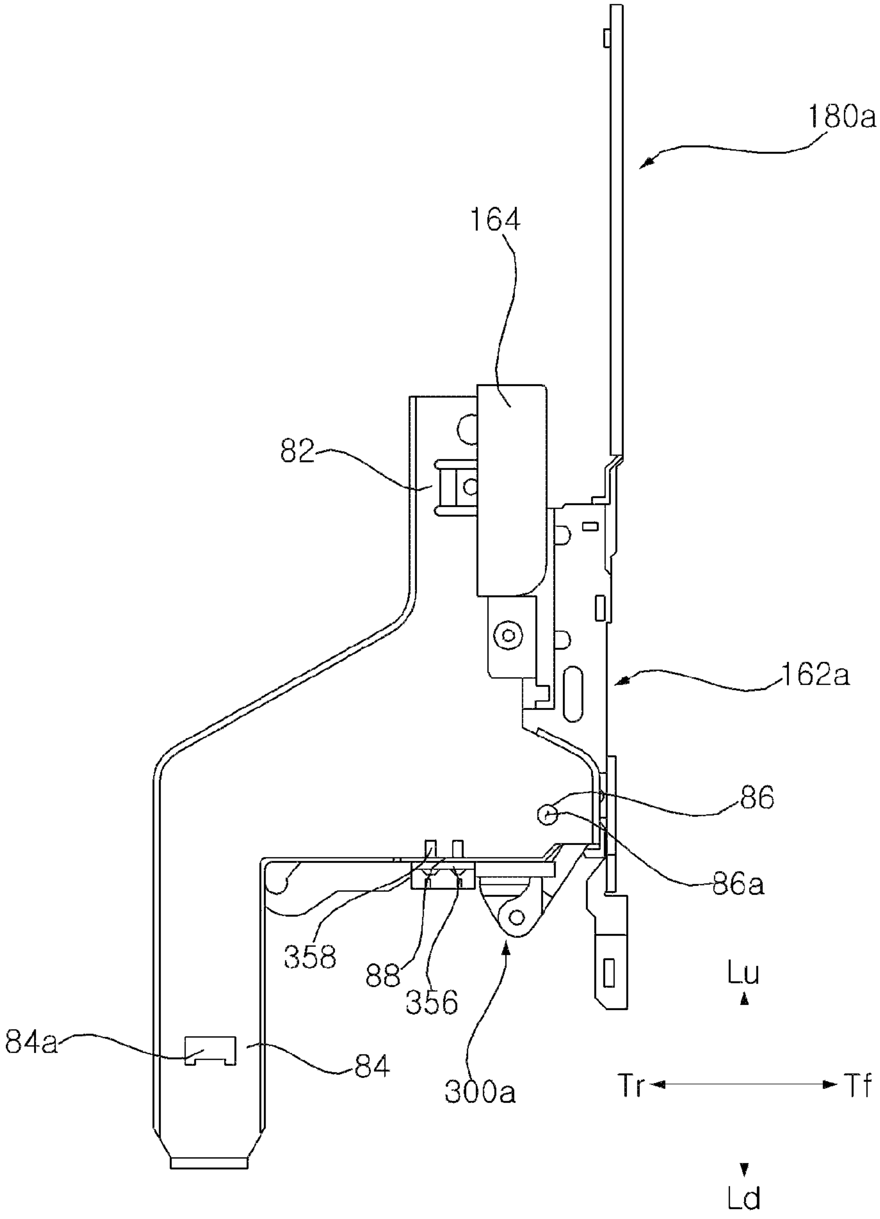
FIG. 7B is one side view of a tub bracket, a door bracket, and a link module according to an embodiment of the present disclosure.
Figure 8A:
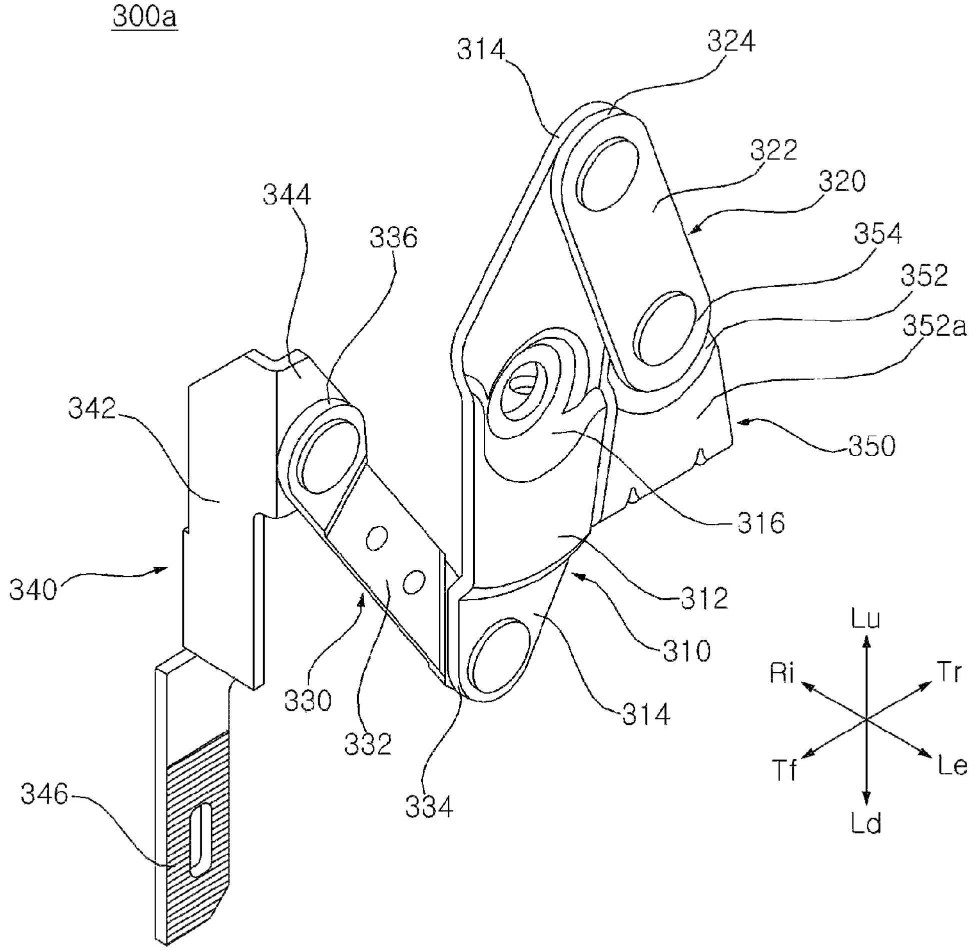
FIG. 8A is a front perspective view of a link module according to an embodiment of the present disclosure.
Figure 8B:
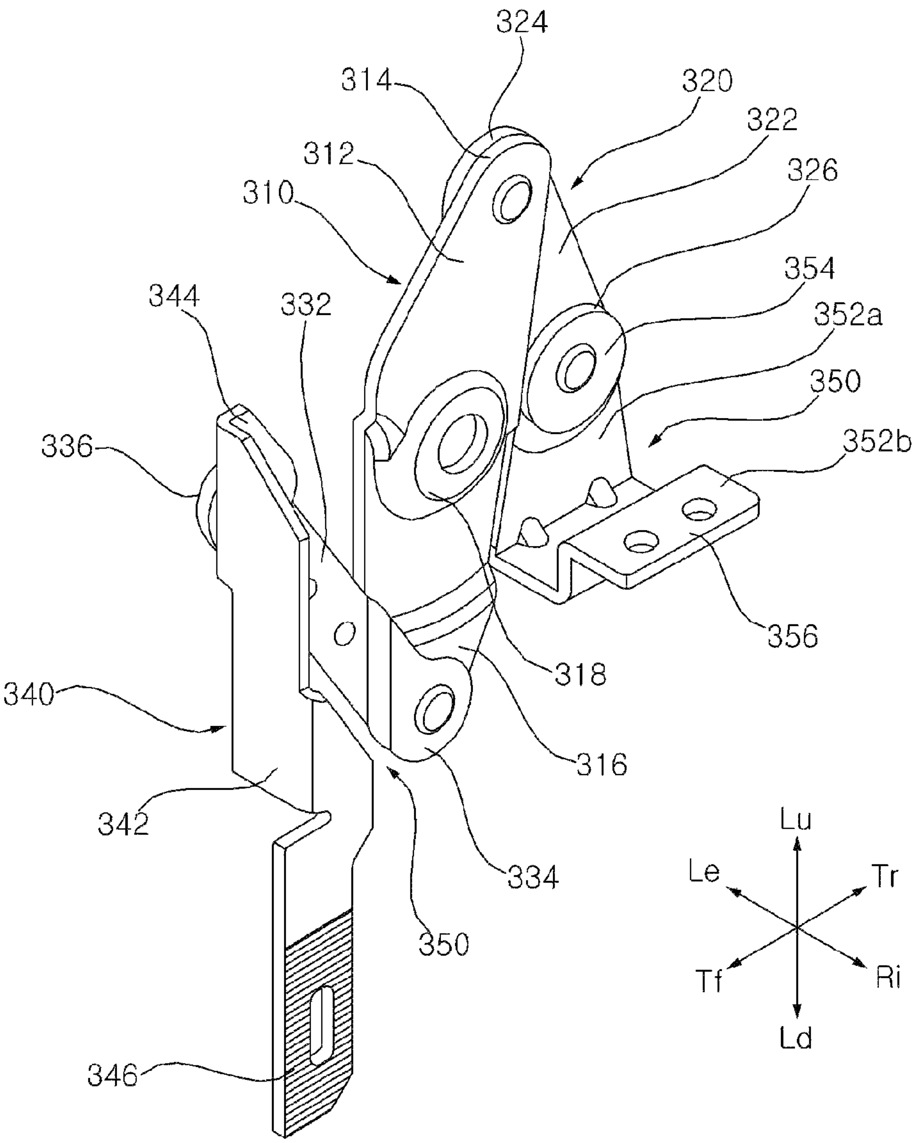
FIG. 8B is a rear perspective view of a link module according to an embodiment of the present disclosure.
Figure 9:
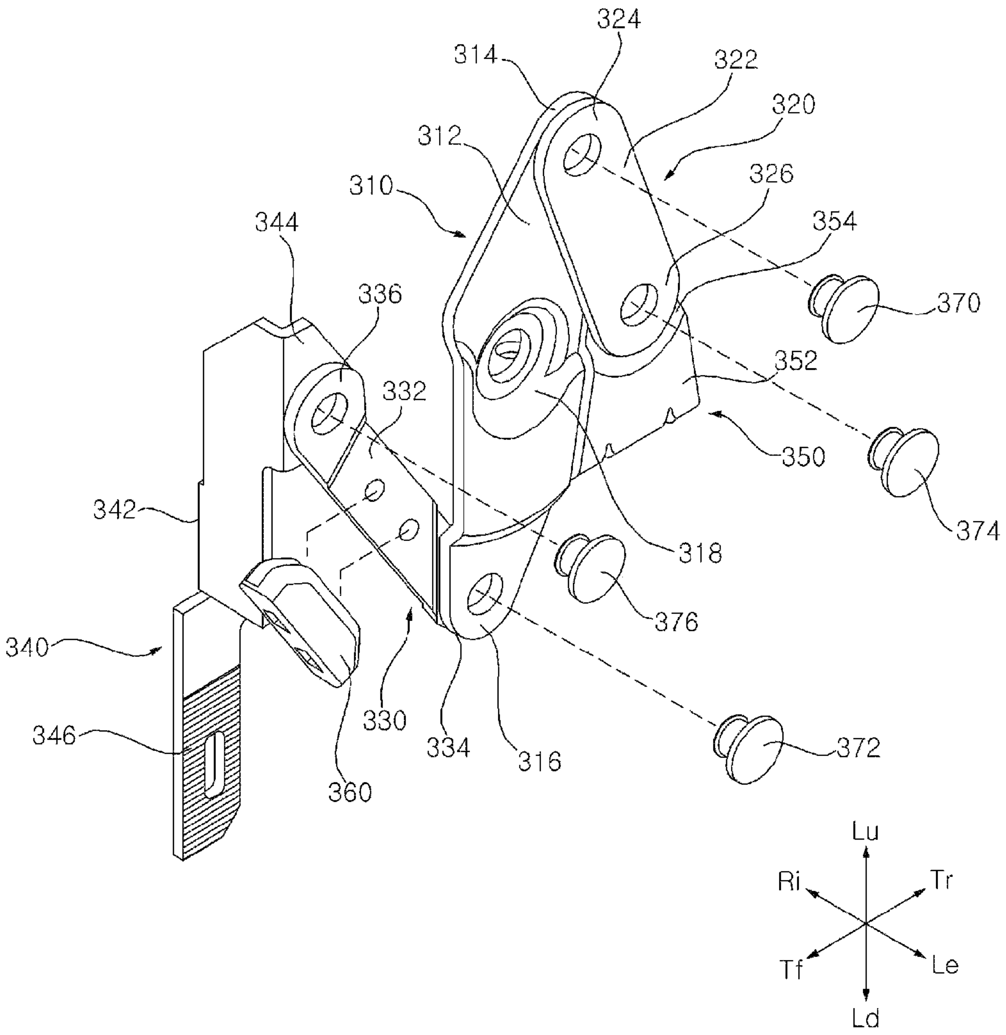
FIG. 9 is a view for explaining a coupling relationship between a link module and a hinge according to an embodiment of the present disclosure.
Figure 10:
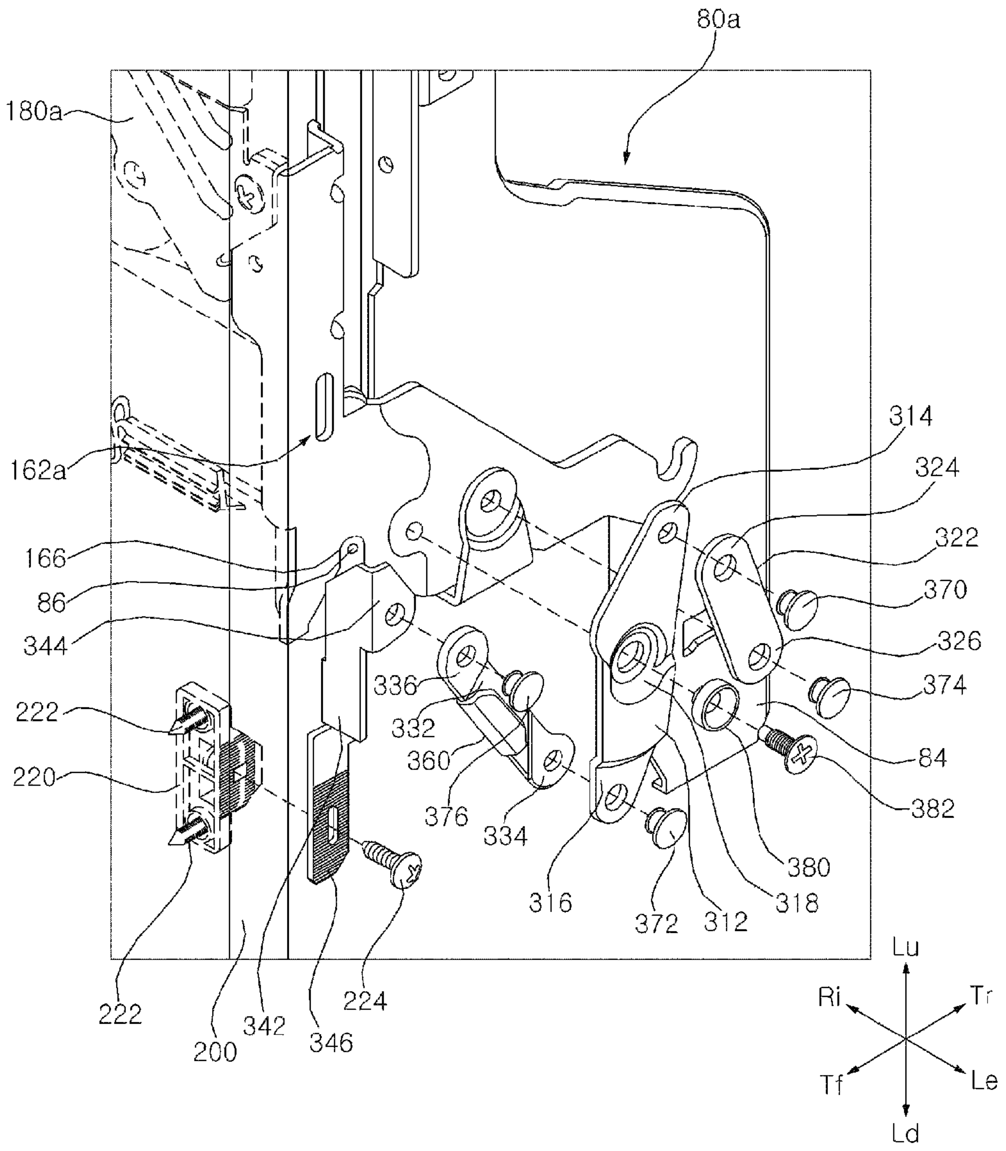
FIG. 10 is a view for explaining a connection relationship between a link module, a tub bracket, a door bracket, and a cover panel according to an embodiment of the present disclosure.

Hereinafter, a tub bracket according to the present embodiment will be described with reference to FIGS. 5, 7A, and 7B.

The dishwasher 1 according to the present embodiment may further include tub bracket 80*a*, 80*b* which is fixedly disposed in a lower portion of the tub 10 and rotatably connected to the door 100. The tub bracket 80*a*, 80*b* may fasten the tub 10 and the base 70. The door 100 according to the present embodiment may be rotatably disposed in the tub bracket 80*a*, 80*b* fastened to the tub 10. Specifically, the door bracket 160*a*, 160*b* fixed to the door 100 are rotatably disposed in the tub bracket 80*a*, 80*b* according to the present embodiment.

A pair of tub brackets 80*a*, 80*b* are disposed in both sides of the tub 10 respectively. The tub bracket 80*a*, 80*b* includes a first tub bracket 80*a* disposed in the left side of the tub 10 and a second tub bracket 80*b* disposed in the right side of the tub 10. The first tub bracket 80*a* and the second tub bracket 80*b* have a symmetrical structure and are disposed in the opposite side of the tub 10. The first tub bracket 80*a* and the second tub bracket 80*b* may be fastened to the front side of the tub 10 and the front side of the base.

Hereinafter, a detailed configuration and shape of the tub bracket 80*a*, 80*b* will be described with reference to FIGS. 7A and 7B. In FIGS. 7A to 7B, the first tub bracket 80*a* will be described as a reference, but the above configuration and shape may be identically applied to the second tub bracket 80*b*.

The tub bracket 80*a*, 80*b* may be respectively fastened to the tub 10 and the base 70. The tub bracket 80*a*, 80*b* may include a tub fastening portion 82 fastened to the tub 10, a base fastening portion 84 fastened to the base 70, and a door connection portion 86 rotatably connected to the door bracket 160*a*, 160*b*.

The tub fastening portion 82 is fastened to one side of the tub 10. The tub fastening portion 82 is disposed at the front end of one side of the tub 10. The tub fastening portion 82 may be fastened to the tub 10 by a separate fastening means (not shown) such as a bolt.

A hinge hole 86*a* formed to be connected to the door bracket 160*a*, 160*b* is formed in the door connection portion 86. A door rotating shaft 100*a* on which the door 100 rotates is formed at the center of the hinge hole 86*a*. The door connection portion 86 is disposed in the lower side of the tub fastening portion 82. The hinge hole 86*a* formed in the door connection portion 86 may be disposed in the front of the tub 10. Accordingly, the door rotating shaft 100*a* on which the door 100 rotates may be formed in the front of the tub 10.

The base fastening portion 84 may extend downward from the rear of the door connection portion 86. The base fastening portion 84 has a structure extending downward from a portion where the base 70 is disposed.

The base fastening portion 84 may be coupled to the base 70 in a hook manner. That is, a hook portion 84*a* coupled to the base 70 is formed in the base fastening portion 84 according to the present embodiment. The hook portion 84*a* of the base fastening portion 84 may be coupled to a corresponding structure of the base 70 in a hook manner.

The tub bracket 80*a*, 80*b* further include a link fastening portion 88 for fixing one side of the link module 300*a*, 300*b*. The link fastening portion 88 may form a surface bent perpendicular to a surface formed by the tub bracket 80*a*, 80*b*. A link bracket 350 of link module 300*a*, 300*b* described below is fastened and fixed to the link fastening portion 88. To the link fastening portion 88, a link bracket-fastening portion 356 of the link bracket 350 is fastened by a separate fastening member 358.

<Door and Door Bracket>

Hereinafter, a door and a door bracket mounted in the door according to the present embodiment will be described with reference to FIGS. 5 to 7B.

The door 100 opens and closes the opened front surface of the tub 10. The door 100 according to the present embodiment includes an inner door 110 that contacts the front surface of the tub 10 and closes the opened portion of the tub 10, a first outer door 120 fastened to the inner door 110 at the front of the inner door 110, and a second outer door 140 which is disposed in the upper side of the first outer door 120 and is fastened to the inner door 110.

The inner door 110 may be located in the open front portion of the tub 10 to close the tub 10. In front of the inner door 110, the second outer door 140 and the first outer door 120 are mounted. The inner door 110 may have a substantially rectangular plate shape. A dispenser 62 in which detergent or the like supplied to the inside of the tub 10 is temporarily stored may be disposed in the inner door 110. The inner door 110 includes a dispenser mounting portion 112 in which the dispenser 62 is mounted. The dispenser 62 is disposed so as to be opened in the inner direction of the inner door 110.

In the inner door 110, a door bracket fastening groove 114*a*, 114*b* in which a part of the first door bracket 162 described below is accommodated is formed. The door bracket fastening groove 114*a*, 114*b* is formed to extend in the vertical direction. The door bracket fastening groove 114*a*, 114*b* forms a concave groove in the rear direction from the front surface on which the first door bracket 162 is mounted. The first door bracket 162 may be inserted into the door bracket fastening groove 114*a*, 114*b* and fixed to the inner door 110 through a separate fastening member (not shown).

A pair of door bracket fastening grooves 114*a*, 114*b* in which a pair of first door brackets 162 are mounted are formed in the inner door 110. Each of the pair of door bracket fastening grooves 114*a*, 114*b* may be formed at both side ends of the front surface of the inner door 110.

The first outer door 120 and the second outer door 140 are fastened to the front surface of the inner door 110. The first outer door 120 and the second outer door 140 are disposed in the vertical direction on the front surface of the inner door 110.

The first outer door 120 is disposed in the front of the inner door 110. The first outer door 120 may be disposed in the lower side of the second outer door 140. The inner door 110 is disposed at the rear of the first outer door 120, and the cover panel 200 is disposed at the front of the first outer door 120.

The first outer door 120 includes a front plate 120*a* and an edge portion 120*b* formed by bending from a circumference of the front plate 120*a*. The front plate 120*a* has a rectangular plate shape, and a lower guider 122*a*, 122*b* and a fastening member moving groove 128*a*, 128*b*, which will be described below, are formed in the front plate 120*a*. The edge portion 120*b* is formed by being bent in the direction of the inner door 110 from both side circumferences of the front plate 120*a*, and may be fastened to the inner door 110 by a separate fastening means (not shown).

In the first outer door 120, the cover panel 200 is mounted to be movable in the length direction of the door 100. The first outer door 120 may have a structure in which a part of upper end is fastened to a lower portion of the second outer door 140. The first outer door 120 includes a lower guider 122*a*, 122*b* for guiding the movement of the cover panel 200. The lower guider 122*a*, 122*b* have a structure for guiding the movement of a lower holder 210*ad*, 210*bd* mounted on the cover panel 200, which will be described below, and may include a structure of a guide hole 124*a*, 124*b* formed in the first outer door 120 and a structure of a bracket hole 184 formed in the second door bracket 180.

A second door bracket 180 is disposed in one side of the first outer door 120. The second door bracket 180 is disposed in the rear surface of the first outer door 120. The bracket hole 184 formed in the second door bracket 180 has the same shape as the guide hole 124*a*, 124*b*. The bracket hole 184 formed in the second door bracket 180 is disposed in the rear of the guide hole 124*a*, 124*b*.

In the first outer door 120, a lower holder insertion hole 126*a*, 126*b* into which the lower holder 210*ad*, 210*bd* is inserted may be formed in the upper side of the guide hole 124*a*, 124*b*. Similarly, an insertion hole 186 corresponding to the lower holder insertion hole 126*a*, 126*b* may be formed in the second door bracket 180 as well.

A fastening member moving groove 128*a*, 128*b* formed in the length direction (Lu-Ld) of the door through which the cover panel fastening member 220 moves is formed in the first outer door 120. The fastening member moving groove 128*a*, 128*b* has a guide structure through which the cover panel fastening member 220 moves. The cover panel fastening member 220 moves along the fastening member moving groove 128*a*, 128*b*, and may move the cover panel 200 in the length direction (Lu-Ld) of the door.

The second outer door 140 is fastened to the front surface of the inner door 110. The second outer door 140 is disposed in the upper side of the first outer door 120. An operation button (not shown) formed to allow a user to operate the dishwasher 1 may be disposed on one side surface of the second outer door 140, and a printed circuit board (not shown) connected to the operation button may be disposed inside the second outer door 140.

In the second outer door 140, the cover panel 200 is movably mounted in the length direction (Lu-Ld) of the door. The second outer door 140 includes an upper guider 142*a*, 142*b* for guiding the movement of the cover panel 200 mounted on the front surface of the second outer door 140.

The upper guider 142*a*, 142*b* includes an upper guide groove 144*a*, 144*b* into which the lower holder 210*ad*, 210*bd* mounted in the cover panel 200 described below is inserted, and a guide rib 146*a*, 146*b* that protrudes from one side of the upper guide groove 144*a*, 144*b* and guides the movement of the lower holder 210*ad*, 210*bd*. A first rigidity reinforcing structure 148*a*, 148*b* for reinforcing the rigidity of the guide rib 146*a*, 146*b* may be formed in the guide rib 146*a*, 146*b*. In addition, in the second outer door 140, a second rigidity reinforcing structure 150*a*, 150*b* for additionally reinforcing the rigidity of the guide rib 146*a*, 146*b* may be formed in one side of the upper guider 142*a*, 142*b*.

A pair of upper guiders 142*a*, 142*b* into which the lower holder 210*ad*, 210*bd* is inserted from both sides are disposed on the front surface of the second outer door 140.

The dishwasher 1 according to the present embodiment further includes a door bracket 160*a*, 160*b* that is fixedly fastened to the door and rotatably connected to the tub 10.

The door bracket 160*a*, 160*b* is fixedly connected to the door 100 and rotatably connected to the tub bracket 80*a*, 80*b* fixedly connected to the tub 10. The door bracket 160*a*, 160*b* may be rotated so that the door 100 opens and closes the opened front surface of the tub 10. A part of the door bracket 160*a*, 160*b* is disposed between the inner door 110 and the first outer door 120.

The door bracket 160*a*, 160*b* includes a first door bracket 162 which is fastened to the first outer door 120 and rotatably connected to the tub 10, and a second door bracket 180 which is connected to the first door bracket 162 and fastened to the inner door 110.

The first door bracket 162 includes a door fastening portion 164 fastened to the door 100, a tub connection portion 166 rotatably connected to the tub 10, and a link connection portion 168 rotatably connected to the first link 310 described below. The first door bracket 162 according to the present embodiment may further include a door fixing portion-connection portion 170 connected to the door fixing portion 390 for maintaining the disposition of the partially opened door 100.

The door fastening portion 164 has a 'E' shape in cross section and extends in the length direction of the door 100. The door fastening portion 164 may be inserted into the door bracket fastening groove 114*a*, 114*b* of the inner door 110 and fastened with a separate fastening member (not shown).

The tub connection portion 166 is disposed in the lower side of the door fastening portion 164. The tub connection portion 166 is rotatably connected to the tub bracket 80*a*, 80*b* fastened to the tub 10. The tub connection portion 166 may be connected to the tub bracket 80*a*, 80*b* through a separate hinge member 198. Accordingly, a hinge hole 166*a* into which the hinge member 198 is inserted may be formed in the tub connection portion 166. Since the tub connection portion 166 is disposed on the door rotating shaft 100*a* on which the door 100 rotates, the position is fixed even if the disposition of the door 100 is changed due to the opening or closing of the door 100.

The link connection portion 168 may be disposed in one side of the tub connection portion 166. The link connection portion 168 may rotate clockwise or counterclockwise around the tub connection portion 166 when the door 100 rotates. The link connection portion 168 according to the present embodiment may be disposed at a rear side Tr of the thickness direction (Tf-Tr) of the door from the tub connection portion 166. A first link 310 of the link module 300*a*, 300*b* is rotatably connected to the link connection portion 168. The link connection portion 168 is rotatably connected to a first link-bracket connection portion 318 of the first link 310. The link connection portion 168 may be connected to the first link 310 through a hinge member 380 and a separate fastening member 382.

When the door 100 rotates, the first link-bracket connection portion 318 of the first link 310 moves along the link connection portion 168.

The door fixing portion-connection portion 170 is disposed in the rear Tr of the thickness direction Tf-Tr of the door from the tub connection portion 166. The door fixing portion-connection portion 170 extends to the rear Tr of the thickness direction (Tf-Tr) of the door from the door 100, and is connected to a connection clip 396 of the door fixing portion 390 at a distal end.

In the distal end of the door fixing portion-connection portion 170 according to the present embodiment, a hook shape is formed, the connection clip 396 is inserted into the above hook shape, and the first door bracket 162 and the door fixing portion 390 may be connected.

The door fastening portion 164 extends upward (Lu) of the length direction (Lu-Ld) of the door, based on the tub connection portion 166, and is fastened to the door 100. The door fixing portion-connection portion 170 extends in the rear Tr of the thickness direction (Tf-Tr) of the door, based on the tub connection portion 166, and is connected to the door fixing portion 390 at the distal end.

The first door bracket 162 includes a first bracket fastening portion 172 fastened to the second door bracket 180. The first bracket fastening portion 172 may be fastened to the second bracket fastening portion 194 of the second door bracket 180 fastened to the first outer door 120 through the fastening member 174. The first bracket fastening portion 172 may be disposed in the front Tf of the thickness direction (Tf-Tr) of the door of the door fastening portion 164.

The first door bracket 162 is disposed between the tub bracket 80*a*, 80*b* and the link module 300*a*, 300*b*.

The second door bracket 180 is disposed between the inner door 110 and the first outer door 120. The second door bracket 180 is fastened to the first outer door 120 at the rear of the thickness direction of the door of the first outer door 120. The second door bracket 180 is fastened and fixed to the first door bracket 162 at one side, and is fastened and fixed to the first outer door 120 at the other side.

The second door bracket 180 may be connected to the first door bracket 162 to distribute the load generated by the cover panel 200 to the first door bracket 162.

The second door bracket 180 according to the present embodiment includes a holder guide portion 182 which is fastened to the rear of the first outer door 120 and guides the movement of the lower holder, and a second bracket fastening portion 194 which extends to the lower side of the holder guide portion 182 and is fastened to the first door bracket 162.

The holder guide portion 182 includes a bracket hole 184 which has a substantially rectangular plate shape and has the lower holder 210*ad*, 210*bd* that moves therein, and an insertion hole 186 into which the lower holder 210*ad*, 210*bd* is inserted. The holder guide portion 182 may include a first surface 188 in contact with the first outer door 120, and a second surface 190 maintaining a gap from the first outer door 120 around the bracket hole 184. The gap between the second surface 190 and the first outer door 120 may be formed as much as a gap of the guide groove (not shown) formed in the lower holder 210*ad*, 210*bd* described below. When the lower holder 210*ad*, 210*bd* is mounted in the lower guider 122*a*, 122*b*, the first outer door 120 and the first surface 188 of the second door bracket 180 are inserted into the guide groove formed on the side surface of the lower holder 210*ad*, 210*bd*.

A covering protrusion 192 for preventing the erroneous mounting of the lower holder 210*ad*, 210*bd* is formed in the lower side of the insertion hole 186. The covering protrusion 192 may have a structure of covering a gap formed between the first outer door 120 and the second surface 190.

<Cover Panel>

Figure 4:
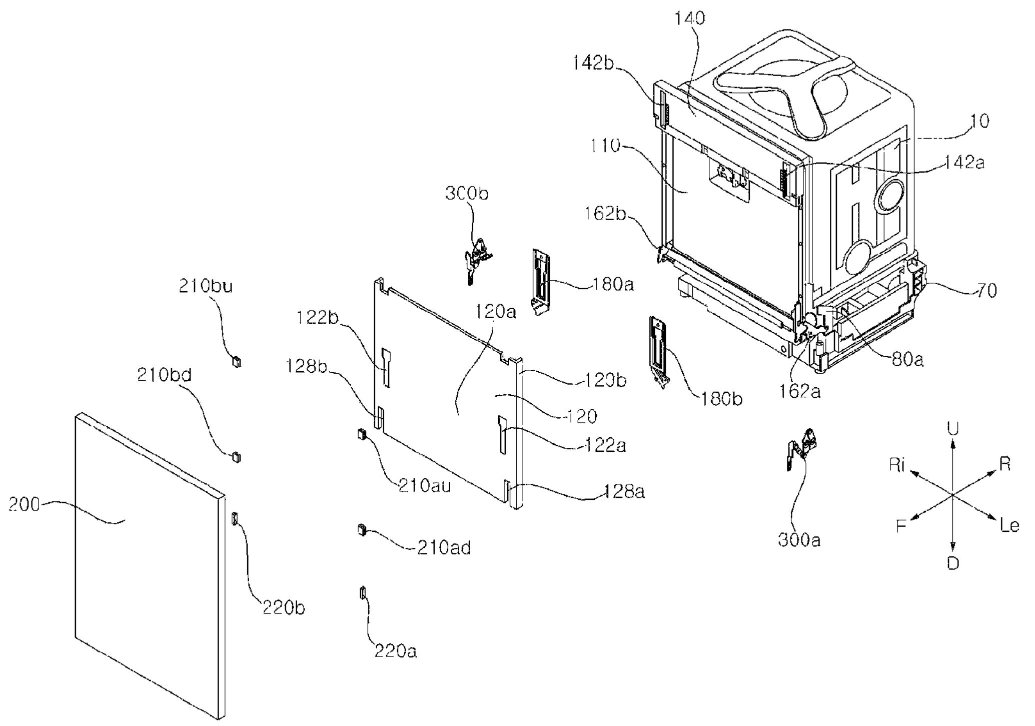
FIG. 4 is an exploded view of a door-related configuration of a dishwasher according to an embodiment of the present disclosure.

Hereinafter, a cover panel according to the present embodiment will be described with reference to FIGS. 4 to 5.

The cover panel 200 according to the present embodiment is disposed in front of the door 100 and, when the door 100 rotates, moves up and down in the length direction (Lu-Ld) of the door 100. The cover panel 200 may have a rectangular plate shape and cover the door 100 and the front surface of the base 70.

The cover panel fastening member 220 which is mounted in one side of the link module 300*a*, 300*b* and moves the cover panel 200, and a holder 210*au*, 210*bu*, 210*ad*, 210*bd* which is mounted in the door 100 and guides the movement of the cover panel 200 are fastened to the cover panel 200. A plurality of holders 210*au*, 210*bu*, 210*ad*, and 210*bd* and a plurality of cover panel fastening members 220 may be fastened to the rear surface of the cover panel 200.

The cover panel fastening member 220 may include a pair of cover panel fastening members 220 connected to each of the pair of link modules 300*a*, 300*b*. The cover panel fastening member 220 may be fastened to the rear surface of the cover panel 200 through a separate fastening member 222. In addition, the cover panel fastening member 220 may be fastened to a link holder-fastening portion 346 of a link holder 340 described below through a separate fastening member 224. The cover panel fastening member 220 may move the position of the cover panel 200 according to the disposition change of the link module 300*a*, 300*b*.

The holder 210*au*, 210*bu*, 210*ad*, 210*bd* according to the present embodiment may include a pair of lower holders 210*ad* and 210*bd* mounted in the upper guider 142*a*, 142*b* of the second outer door 140, and a pair of lower holders 210*ad* and 210*bd* mounted in the lower guider 122*a*, 122*b* of the first outer door 120.

The pair of lower holders 210*ad* and 210*bd* and the pair of lower holders 210*ad* and 210*bd* according to the present embodiment have the same shape. The pair of lower holders 210*ad* and 210*bd* and the pair of lower holders 210*ad* and 210*bd* according to the present embodiment may be classified according to the disposition fastened to the cover panel 200.

<Link Module>

Hereinafter, a link module according to the present embodiment will be described with reference to FIGS. 4, 7A to 12.

The link module 300*a*, 300*b* moves the cover panel 200 disposed in the front of the door 100 in the length direction (Lu-Ld) of the door when the door 100 rotates. The link module 300*a*, 300*b* linearly moves the cover panel 200 by using the rotating force of the door 100.

A pair of link modules 300*a*, 300*b* according to the present embodiment may be provided in both side surfaces of the door respectively. The link module 300*a*, 300*b* according to the present embodiment includes a first link module 300*a* disposed in the right side of the door 100 and a second link module 300*b* disposed in the left side of the door 100. The first link module 300*a* and the second link module 300*b* are disposed in the left and right sides of the door in a form having the same configuration and function.

Hereinafter, a detailed configuration of the first link module 300*a* will be described with reference to FIGS. 7A to 10. The first link module 300*a* described herein may be identically applied to the second link module 300*b*.

In addition, a detailed configuration of the second link module 300*b* will be described with reference to FIG. 11, and the second link module 300*b* described in FIG. 11 may be identically applied to the first link module 300*a*.

The link module 300*a*, 300*b* according to the present embodiment may include a first link 310 rotatably connected to the door bracket 160*a*, 160*b*, a second link 320 rotatably connected to the tub bracket 80*a*, 80*b* and the first link 310, and a third link 330 rotatably connected to the first link 310 and the cover panel 200. The link module 300*a*, 300*b* according to the present embodiment may further include a link bracket 350 connecting the second link 320 and the tub bracket 80*a*, 80*b*, and a link holder 340 connecting the third link 330 and the cover panel 200.

The first link 310 includes a first link-first connection portion 314 which is disposed in one end of a first link body 312 and rotatably connected to the second link 320, a first link-second connection portion 316 which is disposed in the other end of the first link body 312 and rotatably connected to the third link 330, and a first link-bracket connection portion 318 which is disposed between the first link-first connection portion 314 and the first link-second connection portion 316 and rotatably connected to the door bracket 160*a*, 160*b*.

The second link 320 includes a second link body 322, a second link-first connection portion 324 which is disposed in one end of the second link body 322 and rotatably connected to the first link 310, and a second link-second connection portion 326 which is disposed in the other end of the second link body 322 and rotatably connected to the tub bracket 80*a*, 80*b*. The second link-second connection portion 326 may be rotatably connected to the tub bracket 80*a*, 80*b* through the link bracket 350. That is, the second link-second connection portion 326 is rotatably connected to a link bracket-connection portion 354 of the link bracket 350 fastened to the tub bracket 80*a*, 80*b*.

The third link 330 includes a third link body 332, a third link-first connection portion 334 which is disposed in one end of the third link body 332 and rotatably connected to the first link 310, and a third link-second connection portion 336 which is disposed in the other end of the third link body 332 and rotatably connected to the cover panel 200. The third link-second connection portion 336 is rotatably connected to the cover panel 200 through the link holder 340. That is, the third link-second connection portion 336 is rotatably connected to a link holder-connection portion 344 of the link holder 340 fastened to the cover panel 200.

A friction reducing member 360 for reducing friction with the first door bracket 162 is disposed in the third link 330. The third link 330 moves the cover panel 200 in the length direction (Lu-Ld) of the door when the door 100 is rotated. Accordingly, the third link 330 may be deformed or moved in the vertical direction of the moving direction by a load generated by moving the cover panel 200 in the length direction (Lu-Ld) of the door. The friction reducing member 360 may be disposed in contact with the first door bracket 162, and may prevent the shape of the third link 300 from deforming, or may prevent movement of the third link 300 in a direction different from the movement direction of the link.

One side of the link bracket 350 is fixed to the tub bracket 80*a*, 80*b*, and the other side is rotatably connected to the second link 320. Accordingly, the position of the second link-second connection portion 326 of the second link 320 rotatably connected to the link bracket 350 is fixed.

The link bracket 350 includes a link bracket body 352, a link bracket-connection portion 354 which is disposed in one end of the link bracket body 352, and to which the second link 320 is rotatably connected, and a link bracket-fastening portion 356 which is disposed in the other end of the link bracket body 352 and fixed to the tub bracket 80*a*, 80*b*.

The link bracket body 352 may have a shape vertically bent between the link bracket-connection portion 354 and the link bracket-fastening portion 356. The link bracket body 352 according to the present embodiment may have a bent shape in a plurality of portions. The door bracket 160*a*, 160*b* may be disposed between the link bracket body 352 and the tub bracket 80*a*, 80*b*. The link bracket body 352 includes a vertical body 352*a* that forms a plane parallel to the tub bracket 80*a*, 80*b*, and a horizontal body 352*b* that separates the vertical body 352*a* from the tub bracket 80*a*, 80*b* by a certain gap. The link bracket-connection portion 354 is disposed at a distal end of the vertical body 352*a*, and the link bracket-fastening portion 356 is disposed at a distal end of the horizontal body 352*b*. The vertical body 352*a* and the horizontal body 352*b* are disposed perpendicular to each other. The link bracket body 352 may further include a spacing portion 352*c* that separates the vertical body 352*a* and the horizontal body 352*b* from each other. The spacing portion 352*c* is disposed between the vertical body 352*a* and the horizontal body 352*b*, and a space 352*d* may be formed in the lower side so that some components of the first door bracket 162*a*, 162*b* are disposed.

The link bracket-fastening portion 356 is fastened to one side of the tub bracket 80*a*, 80*b* so that the disposition is fixed. The link bracket-fastening portion 356 according to the present embodiment is fastened to the tub bracket 80*a*, 80*b* through a separate fastening member 358. The link bracket-fastening portion 356 is fixed to the tub bracket 80*a*, 80*b* to fix the disposition of the link bracket 350. Accordingly, even when the door 100 is rotated, the position of the link bracket-connection portion 354 rotatably connected to the second link 320 may be fixed.

The link holder 340 includes a link holder body 342, a link holder-connection portion 344 which is disposed in one end of the link holder body 342, and to which the third link 330 is rotatably connected, and a link holder-fastening portion 346 which is disposed in the other end of the link holder body 342 and is fastened to the cover panel 200. The link holder 340 is connected to the cover panel 200 through the cover panel fastening member 220 that is fastened to the cover panel 200. The link holder 340 is fastened to the cover panel fastening member 220 so that the disposition is fixed.

The link holder 340 may dispose a position to which the cover panel 200 and the link module 300*a*, 300*b* are fastened to the lower side of the tub 10. The link holder-fastening portion 346 of the link holder 340 may be disposed below the lower end of the first outer door 120. When the door 100 is closed, the link holder-fastening portion 346 of the link holder 340 is disposed below the lower end of the first outer door 120.

That is, the cover panel fastening member 220 mounted in the cover panel 200 and the link holder-fastening portion 346 of the link holder 340 can be fastened in a lower space of the tub 10, so that a user may assemble the cover panel 200 to the link module 300*a*, 300*b*. Since the link holder-fastening portion 346 is fixedly fastened to the cover panel fastening member 220, the disposition of the link holder 340 may be uniformly maintained in relation to the cover panel 200.

The first link 310 and the second link 320 may be rotatably connected through a first hinge 370. The first link 310 and the third link 330 may be rotatably connected through a second hinge 372. The second link 320 may be rotatably connected to the link bracket 350 through a third hinge 374. The third link 330 may be rotatably connected to the link holder 340 through a fourth hinge 376.

The first link 310 is formed longer than the second link 320 and the third link 330. The length of a straight line L1 (hereinafter, 'the length of the first link') connecting the center of the first link-first connection portion 314 and the center of the first link-second connection portion 316 is formed to be longer than the length of a straight line L2 (hereinafter, 'the length of the second link') connecting the center of the second link-first connection portion 324 and the center of the second link-second connection portion 326, and the length of a straight line L3 (hereinafter, 'the length of the third link') connecting the center of the third link-first connection portion 334 and the center of the third link-second connection portion 336. The length of the third link 330 is formed to be longer than the length of the second link 320.

The length of a straight line L12 (hereinafter, 'first link second straight line') from a link shaft 300*c* to the center of the first link-second connection portion 316 is formed to be longer than the length of a straight line L11 (hereinafter, 'first link first straight line') from the link shaft 300*c* to the center of the first link-first connection portion 314. The length of a virtual straight line L12 extending from the first link-bracket connection portion 318 to one end 316 of the first link 310 connected to the third link 330 is formed to be longer than the length L11 of a virtual straight line extending from the first link-bracket connection portion 318 to the other end 314 of the first link 310 connected to the second link 320. Accordingly, when the first link 310 moves according to the movement of the link shaft 300*c*, the movement range in the length direction (Lu-Ld) of the door of the cover panel 200 can be increased by increasing the movement range of the third link 330 connected to the cover panel 200.

The first link first straight line L11 and the first link second straight line L12 form an inclination angle θ0 with each other. A virtual straight line L12 extending from the first link-bracket connection portion 318 to one end of the first link 310 connected to the third link 330 and a virtual straight line L11 extending from the first link-bracket connection portion 318 to the other end of the first link 310 connected to the second link 320 form an inclination angle θ0 with each other. Accordingly, the link shaft 300*c* where the first link first straight line L11 and the first link second straight line L12 meet is spaced forward than the straight line L1 connecting the center of the first link-first connection portion 314 and the center of the first link-second connection portion 316. The inclination angle θ0 formed between the first link first straight line L11 and the first link second straight line L12 may be formed to be less than 180 degrees.

The inclination angle θ0 formed between the first link first straight line L11 and the first link second straight line L12 is formed in a range of 175 degrees or less, so that the first link-second connection portion 316 can be lifted upwards when the fully opened door 100 rotates in the closing direction, and it is preferable to be formed in a range of 160 degrees or more so as to reduce a gap between the first link 310 and the third link 330 in the closed door 100.

This is, in a state in which the door 100 is fully opened, even if the angle formed by the straight line L1 connecting the center of the first link-first connection portion 314 and the center of the first link-second connection portion 316, and the straight line L3 connecting the center of the third link-first connection portion 334 and the center of the third link-second connection portion 336 is formed close to a straight angle, the angle θ2 formed between the first link second straight line L12 and the straight line L3 connecting the center of the third link-first connection portion 334 and the center of the third link-second connection portion 336 forms an angle narrower than the straight angle, thereby preventing a malfunction of the link that may occur when the door 100 is closed.

<Door Fixing Portion>

Figure 3:
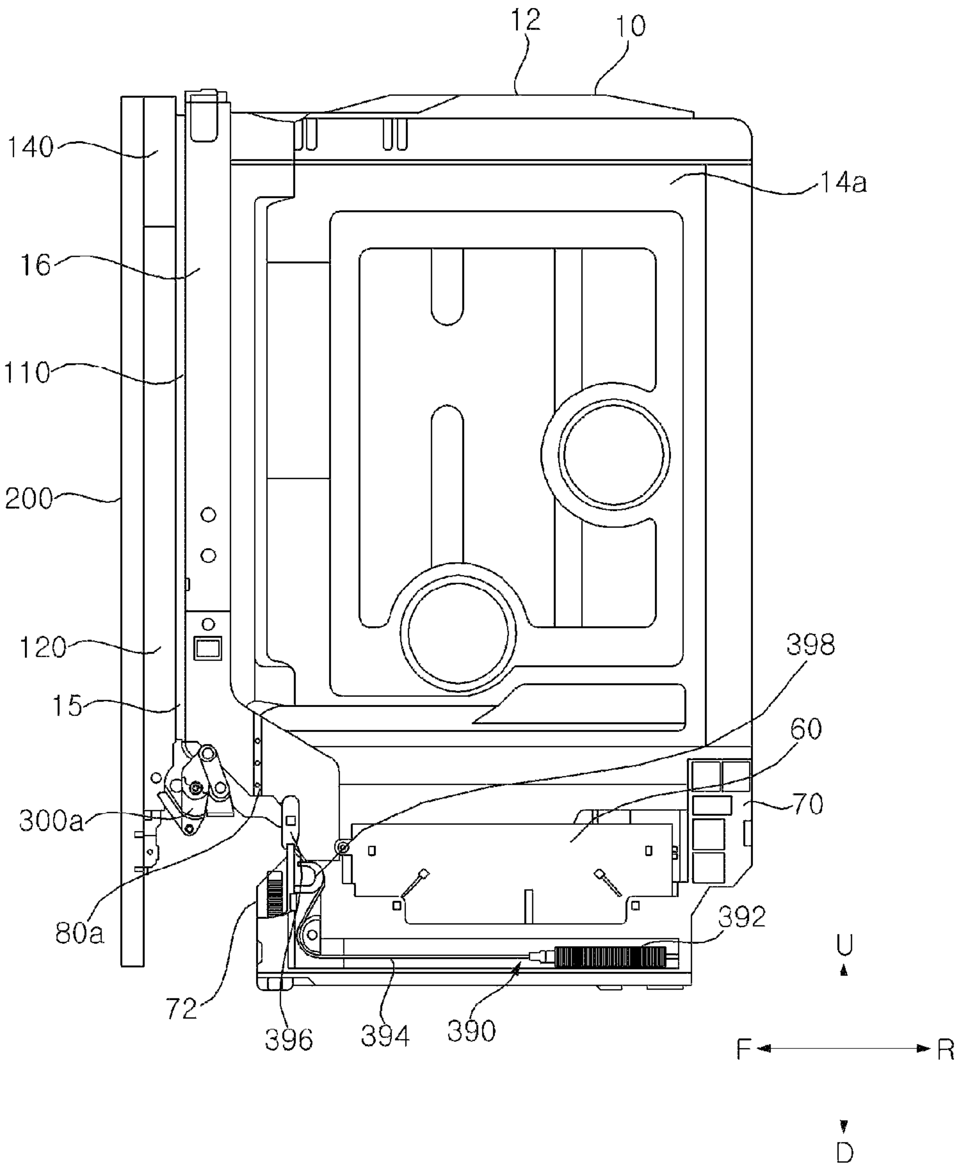
FIG. 3 is a side view of a dishwasher according to an embodiment of the present disclosure.

Hereinafter, a door fixing portion according to the present embodiment will be described with reference to FIG. 3.

The dishwasher according to the present embodiment includes a door fixing portion 390 that maintains the disposition of the door 100 opened from the tub 10.

The door fixing portion 390 according to the present embodiment may maintain the disposition of the door 100. The door fixing portion 390 is connected to the door bracket 160*a*, 160*b*, and applies an elastic force to the door 100 in a direction opposite to the direction in which the door 100 is opened.

The door fixing portion 390 includes an elastic member 392 that applies an elastic force to the rear of the door 100, a connecting member 394 connecting the elastic member 392 and one side of the door 100, and a connecting clip 396 which is disposed in a distal end of the connecting member 394 and fastened to the door fixing portion-connecting portion 170 of the door bracket 160*a*, 160*b*.

The door fixing portion 390 may further include a friction member 398 for applying a frictional force to the connecting member 394. The friction member 398 may expand the range of the parallel relationship of a force generated between the elastic member 392 and the door 100 in which the cover panel 200 is mounted, by applying friction in a direction perpendicular to the direction in which the connecting member 394 extends, or in an inclined direction. Accordingly, the door 100 in which the cover panel 200 having a certain weight is mounted can be maintained in a state of being opened from the tub 10 at a certain angle.

The door fixing portion 390 is connected to the door fixing portion-connection portion 170 of the first door bracket 162 fixed to the door 100. The first door bracket 162 is fixedly disposed in the door 100, and the door fixing portion-connection portion 170 is disposed in the door in the rear Td of the thickness direction (Tf-Td) of the door 100. The door fixing portion 390 connected to the first door bracket 162 applies a force rearward (R) downward (D) of the door fixing portion-connection portion 170 formed in the rear end of the first door bracket 162.

<Door Operation>

Referring to FIGS. 12A to 12C, the disposition of the link module 300*a*, 300*b* is changed according to the rotation of the door 100, and the cover panel 200 movably disposed in the door 100 is moved.

In a state in which the door 100 is closed, the link shaft 300*c* is disposed in the rear side of the door rotating shaft 100*a* in the door thickness direction (Tf-Tr).

In a state in which the door 100 is closed, the angle (hereinafter, 'the angle formed by the first link second straight line L12 and the third link L3) θ2 formed by the straight line (L12) connecting the center of the first link-first connection portion 314 and the link shaft 300*c*, and the straight line L3 connecting the center of the third link-first connection portion 334 and the center of the third link-second connection portion 336 forms an acute angle less than 90 degrees.

Specifically, when the door 100 is closed, the angle θ2 formed by the first link second straight line L12 and the third link L3 may be formed to be 45 degrees or less. Therefore, the force acting on the cover panel 200 by the door 100 that moves to the upper side of the first link 310 from the initial opening operation is formed to be large than the force acting on the cover panel 200 as the angle θ2 formed by the third link 330 and the second straight line L12 of the first link increases, so that the movement range of the cover panel 200 in the initial opening operation of the door 100 may be increased.

That is, as shown in FIG. 12A, from the closed state of the door 100 until the door is half-open or more (hereinafter, 'in an initial open state') as shown in FIG. 12B, when the door 100 rotates in the opening direction, the amount of movement of the cover panel 200 per unit rotation may be formed to be larger than the amount of movement of the cover panel 200 per unit rotation, when the door 100 rotates in the opening direction, from a state in which the door of FIG. 12B is half-open or more to a state (hereinafter, 'in a later open state') in which the door 100 of FIG. 12C is fully opened.

In a state in which the door 100 is closed, the angle (hereinafter, 'the angle formed by the first link first straight line L11 and the second link L2) θ1 formed by the straight line L11 connecting the center of the first link-first connection portion 314 and the link shaft 300*c* and the straight line L2 connecting the center of the second link-first connection portion 324 and the center of the second link-second connection portion 326 forms an acute angle less than 90 degrees.

In a state in which the door 100 is closed, the link shaft 300*c* is disposed between the door rotating shaft 100*a* and the second link-second connection portion 326 of the second link 320.

In a state in which the door 100 is fully opened, the angle θ2 formed by the first link second straight line L12 and the third link L3 may form an obtuse angle smaller than 180 degrees. In a state in which the door 100 is fully opened, the angle θ2 formed by the first link second straight line L12 and the third link L3 may be formed in a range of 160 degrees to 175 degrees.

In a state in which the door 100 is fully opened, the angle θ1 formed by the first link first straight line L11 and the second link L2 may be formed to be close to a right angle. In a state in which the door 100 is fully opened, the angle θ1 formed by the first link first straight line L11 and the second link L2 may be formed in a range of 80 degrees to 100 degrees.

Here, the fully opened state of the door 100 is a state in which the door 100 is rotated to the extent that it cannot rotate any more in the direction in which the door 100 is opened, and may be a state in which the door 100 is vertically disposed on the open surface of the tub 10 as shown in FIG. 12C.

When the door 100 is opened, the link shaft 300*c* moves from the rear of the door rotating shaft 100*a* to the front and upper side of the door rotating shaft 100*a*. Referring to FIGS. 12A to 12C, when the door 100 is opened, the link shaft 300*c* may rotate counterclockwise based on the door rotating shaft 100*a*. However, the rotating direction of the link shaft 300*c* may vary depending on the direction in which the link module 300*a*, 300*b* are viewed.

When the door 100 is opened, the angle θ1 formed by the first link first straight line L11 and the second link L2 can be changed from an acute angle of 45 degrees or less to a right angle close to 90 degrees. When the door 100 is opened, the angle θ2 formed by the first link second straight line L12 and the third link L3 can be changed from an acute angle of 45 degrees or less to an obtuse angle of less than 180 degrees.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A dishwasher comprising:

a tub defining a space, and an opening at a front side;

a base disposed at a lower side of the tub and separating the tub from a floor surface of the dishwasher by a first predefined gap;

a door configured to open and close the opening of the tub;

a door bracket coupled to the door, rotatably connected to the tub, and configured to rotate the door based on a door rotating shaft;

a cover panel covering the door and detachably mounted at the door; and a link module connected to the door and the cover panel respectively and configured to, based on the door being rotated, move the cover panel in a length direction of the door;

wherein the link module comprises:

a first link defining a first link-bracket connection portion connected to the door bracket at a position spaced apart from the door rotating shaft by a second predefined gap;

a second link disposed at a rear side of the first link and rotatably connected to the first link and the tub respectively; and a third link disposed at a front side of the first link and having both ends rotatably connected to the first link and the cover panel respectively, wherein, based on the door being closed, a center of the first link-bracket connection portion is disposed vertically lower than the door rotating shaft, wherein, based on the door being opened from a closed position, the center of the first link-bracket connection portion is configured to rotate relative to the door rotating shaft and is positioned above the door rotating shaft.

2. The dishwasher of claim 1, wherein the first link-bracket connection portion is rotatably connected to the door bracket.

3. The dishwasher of claim 2, wherein the first link-bracket connection portion is connected to the door bracket so as to be disposed in a rear in a thickness direction of the door from the door rotating shaft.

4. The dishwasher of claim 2, further comprising a tub bracket coupled to the tub and the base and rotatably connected to the door bracket.

5. The dishwasher of claim 4, wherein the tub bracket comprises:

a door connection portion to which the door bracket is rotatably connected;

a tub fastening portion extending to an upper side of the door connection portion and coupled to the tub; and a base fastening portion extending to a lower side at a rear of the door connection portion and coupled to the base.

6. The dishwasher of claim 5, wherein the link module further comprises a link bracket connecting the second link and the tub bracket, wherein the link bracket is connected to a first end of the second link at the rear side of the door rotating shaft.

7. The dishwasher of claim 6, wherein, based on the door being closed, the first link-bracket connection portion is disposed between the door rotating shaft and the first end of the second link connected to the link bracket.

8. The dishwasher of claim 1, wherein a length of a virtual straight line extending from the first link-bracket connection portion to a first end of the first link connected to the third link is longer than a length of a virtual straight line extending from the first link-bracket connection portion to a second end of the first link connected to the second link.

9. The dishwasher of claim 1, wherein a virtual straight line extending from the first link-bracket connection portion to a first end of the first link connected to the third link and a virtual straight line extending from the first link-bracket connection portion to a second end of the first link connected to the second link form an inclination angle.

10. The dishwasher of claim 1, wherein the door comprises:

an inner door contacting a front surface of the tub and configured to close the opening of the tub;

a first outer door coupled to the inner door at a front side of the inner door; and a second outer door disposed at an upper portion of the first outer door and coupled to the inner door.

11. The dishwasher of claim 10, wherein the door bracket comprises:

a first door bracket coupled to the first outer door and rotatably connected to the tub; and a second door bracket connected to the first door bracket and coupled to the inner door.

12. The dishwasher of claim 11, wherein the first door bracket comprises:

a tub connection portion rotatably connected to the tub;

a door fastening portion extending from the tub connection portion and coupled to the inner door; and a link connection portion rotatably connected to the first link-bracket connection portion, wherein the link connection portion is disposed in a rear of thickness direction of the door from the tub connection portion.

13. The dishwasher of claim 12, further comprising a door fixing portion configured to, based on the door being opened, maintain a disposition of the door by applying a force to the door in a direction opposite to a load acting on the door, wherein the first door bracket further comprises a door fixing portion-connection portion extending from the tub connection portion to the rear of thickness direction of the door and connected to the door fixing portion.

14. The dishwasher of claim 1, wherein the link module further comprises a link holder connecting the third link and the cover panel, and wherein the link holder extends to a lower side of the length direction of the door from a first end connected to the third link and connected to the cover panel at a lower end of the length direction of the door.

15. The dishwasher of claim 1, wherein, based on the door being closed, a virtual straight line extending from the first link-bracket connection portion to a first end of the first link connected to the third link and a virtual straight line extending from a first end of the third link to a second-end form an angle of 45 degrees or less.

* * * * *